(12) United States Patent
Johnston et al.

(10) Patent No.: US 9,406,159 B2
(45) Date of Patent: Aug. 2, 2016

(54) PRINT-READY DOCUMENT EDITING USING INTERMEDIATE FORMAT

(71) Applicant: CANON KABUSHIKI KAISHA, Tokyo (JP)

(72) Inventors: David Ian Johnston, Leichhardt (AU); Joseph Leigh Belbin, Mount Colah (AU); Zachary Theodore Warren, Lane Cove (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/697,421

(22) Filed: Apr. 27, 2015

(65) Prior Publication Data
US 2015/0317814 A1 Nov. 5, 2015

(30) Foreign Application Priority Data
Apr. 29, 2014 (AU) ................................ 2014202321

(51) Int. Cl.
  G06K 15/00 (2006.01)
  G06T 11/60 (2006.01)
  G06F 3/12 (2006.01)

(52) U.S. Cl.
  CPC .............. *G06T 11/60* (2013.01); *G06F 3/1208* (2013.01); *G06F 3/1256* (2013.01); *G06F 3/1298* (2013.01)

(58) Field of Classification Search
  None
  See application file for complete search history.

(56) References Cited

U.S. PATENT DOCUMENTS

| | | | |
|---|---|---|---|
| 6,927,865 B1 | 8/2005 | Kujirai et al. | |
| 7,900,144 B1* | 3/2011 | Edge ................... | G06K 15/129 345/589 |
| 8,014,013 B2* | 9/2011 | Owen ................... | G06F 3/1205 358/1.15 |
| 2005/0206653 A1 | 9/2005 | Beaumont | |
| 2007/0109581 A1* | 5/2007 | Saitoh ................... | G06F 3/1208 358/1.13 |
| 2009/0327873 A1 | 12/2009 | Cairns | |
| 2011/0007355 A1* | 1/2011 | Hibino ................... | G06F 3/1218 358/1.15 |
| 2011/0075166 A1* | 3/2011 | Goldwater ............ | G06F 3/1205 358/1.9 |
| 2011/0075200 A1* | 3/2011 | Goldwater ............ | G06F 3/1205 358/1.15 |
| 2012/0166934 A1* | 6/2012 | Kihara ................... | G06F 3/1208 715/234 |
| 2014/0055486 A1* | 2/2014 | Morrison .................. | G06T 1/00 345/626 |
| 2015/0178881 A1* | 6/2015 | Qian ......................... | G06T 1/20 345/505 |

FOREIGN PATENT DOCUMENTS

| | | | |
|---|---|---|---|
| AU | 2006235850 A1 | 5/2008 | |
| AU | 2009251018 A1 | 7/2011 | |

* cited by examiner

*Primary Examiner* — Dung Tran
(74) *Attorney, Agent, or Firm* — Canon USA, Inc. I.P. Division

(57) ABSTRACT

A computer implemented method to modify an intermediate representation of graphics data written in a page description language is described. The method renders the graphics data to produce a print preview representation stored as intermediate graphics data in an intermediate graphics format. A modifying operation for modifying graphics content of the print preview representation is detected, and the method determines whether the print preview representation contains information about the graphics data required to perform the modifying operation based on a class of the modifying operation and a content of the print preview representation affected by the detected modifying operation. Where the print preview representation contains information required to perform the modifying operation, the print preview representation is modified, and otherwise the method utilizes the graphics data written in the page description language to apply the modifying operation. An apparatus, storage medium and printer using the method(s) are also discussed.

20 Claims, 18 Drawing Sheets

PRINT-READY DOCUMENT EDITING USING INTERMEDIATE FORMAT

REFERENCE TO RELATED PATENT APPLICATION

This application claims the benefit under 35 U.S.C. §119 of the filing date of Australian Patent Application No. 2014202321, filed 29 Apr. 2014, which is hereby incorporated by reference in its entirety as if fully set forth herein.

TECHNICAL FIELD

These inventions relate to the field of print-ready document editing. In particular, the inventions relate to at least a system which allows a print operator to make changes to a document which is otherwise in a final format that is suitable for printing, such as PDF.

BACKGROUND

In the professional printing field, output quality is of primary importance. It is often necessary for an operator or user of a printer to make small changes to the document being printed before the document is mass produced. Often the operator wishes to make changes to the colour of objects on the page. These changes are typically done in a preview application that runs on a Digital Front End of the printer (being the operator console, typically shortened to DFE), and edits performed by the operator are usually made to the print-ready version of the document, not to the source document. The print-ready version of the document is usually in a final format like PDF, that it not as suitable for editing as was the original source document(s). While document ready formats like PDF can be edited, typically rendering them is slow, so that it is difficult to construct a responsive editor using them.

One common approach used for such a preview/editing application (editor) is to edit a rendered bitmap version of the page. This approach has the advantage that making the change requested by the user is fast, so it is possible to instantly reflect the requested change in the user interface. A responsive user interface is desirable, as the operator can explore changes to the document, without the annoyance of over-correcting. A disadvantage of this approach is that the rendered bitmap has lost all transparency and object information that existed in the input print-ready file format. This makes it difficult for the editor to limit changes to the boundaries of objects (which is often required by the user/operator). Instead, the editor must limit changes to contrast edges or the boundaries of colour changes in the bitmap, and while this can work reasonably well for patches of solid colour, it is error prone for objects such as colour gradients, where overlaid transparent objects makes edges indistinct or for over-all changes to embedded images.

A second approach which avoids the problems of the bitmap method, is to make the edits in the input print-ready format. This has the advantage that all object information is retained, so edits can follow object boundaries precisely. However, the disadvantage of this approach is that after the change specified by the user/operator has been made, the print-ready format must be re-rendered, and this can be slow. This slowness makes it difficult to create a responsive user interface, and the resulting system can be annoying and difficult to use.

A variation of the second approach, which tries to resolve the user-responsiveness issue, is to convert the input print-ready format into the format of a standard editing tool. This approach has the disadvantage that page information may be lost in the conversion to the editing format. Further, conversion of the format to that of the standard edit tool is often inaccurate, causing errors and necessitating further processing to remove or avoid the errors.

SUMMARY

According to one aspect of the present disclosure there is provided a method for modifying an intermediate representation of graphics data written in a page description language, the method comprising: rendering the graphics data to produce a print preview representation stored as intermediate graphics data in an intermediate graphics format; detecting a modifying operation for modifying a graphics content of the print preview representation; determining whether the print preview representation contains information about the graphics data required to perform the modifying operation based on a class of the modifying operation and a content of the print preview representation affected by the detected modifying operation; and where the print preview representation contains information required to perform the modifying operation, modifying the print preview representation, and otherwise utilising the graphics data written in the page description language to apply the modifying operation.

Preferably, the modifying of the print preview representation comprises: selecting a region of interest to be modified; determining a compositing sequence associated with the region of interest using data from the intermediate graphical representation, the compositing sequence comprising at least one representative colour element; identifying portions in the intermediate graphics data affected by the representative colour element by analysing compositing sequences associated with the portions in the intermediate graphical representation using the representative colour element, the identified portions forming an object contributing to the region of interest having a representative colour defined by the representative colour element; and rendering the identified portions using the representative colour element to form the contributing object having the representative colour.

In another implementation, the modifying may comprise: selecting a region of interest to be modified; determining a compositing sequence associated with the region of interest using the intermediate graphics data, the compositing sequence comprising at least one representative colour element; selecting at least one representative compositing sequence using the representative colour element, the selected representative sequence comprising said representative colour element; identifying portions in the intermediate graphics data associated with the selected representative compositing sequence, the identified portions forming an object contributing to the region of interest having a representative colour defined by the representative colour element; rendering the identified portions using the representative colour element to form the contributing object having the representative colour; and displaying, independently from the displayed print preview representation, the contributing object having the representative colour to adjust the print preview representation.

Preferably the method further comprises displaying, independently from the print preview representation of the document, the contributing object having the representative colour to modify the print preview representation.

The modifying operation is advantageously at least one of changing colour, changing transparency, and changing z-order.

In a specific implementation, the determining of whether the print preview representation contains information about the graphics data required to perform the modifying operation is further based on the intermediate graphics format.

In another implementation, the utilising of the graphics data written in the page description language comprises generating a further print preview representation stored in a further intermediate graphics format containing the required information to perform the modifying operation. More preferably, the generating the further print preview representation comprises preserving obscured objects in the intermediate graphical representation, where the modifying operation is at least one of changing transparency and changing z-order.

In a specific example, where the print preview representation does not contain information required to perform the modifying operation, one or more embodiments of a method for modifying an intermediate representation of graphics data written in a page description language may further include modifying the initial graphical representation of the document.

Typically, the initial graphical representation is a PDL representation of the document. Preferably, the intermediate graphics format data is a fillmap representation and the further intermediate graphics format is a high-flexibility fillmap representation.

In a specific implementation, portions affected by the representative colour element are identified by selecting, from a plurality of pixel runs in the intermediate graphics format, pixel runs associated with a compositing sequence comprising the representative colour element. Preferably, this approach further comprises identifying pixel runs in a vicinity of the region of interest by extending searching for pixel runs about the region of interest, and stopping once no compositing sequence comprising the representative colour element is found.

Another implementation further comprises updating a compositing sequence of at least one pixel run affected by the representative colour element using the adjusted colour of the contributing object. Here preferably the method further comprises determining a plurality of tiles affected by the updating in the compositing sequences and rendering said tiles to adjust the graphical representation In another implementation the contributing object has a shape identified by the intermediate graphical representation.

Preferably the determining the compositing sequence step comprises:
identifying a corresponding edge in the graphical representation using a position of the region of interest; and
determining a compositing sequence associated with the identified edge.
Other aspects are also disclosed.

BRIEF DESCRIPTION OF THE DRAWINGS

At least one embodiment of the present inventions will now be described with reference to the drawings, in which.

DETAILED DESCRIPTION INCLUDING BEST MODE

Context
High Level View of Digital Front End

Figure 1:
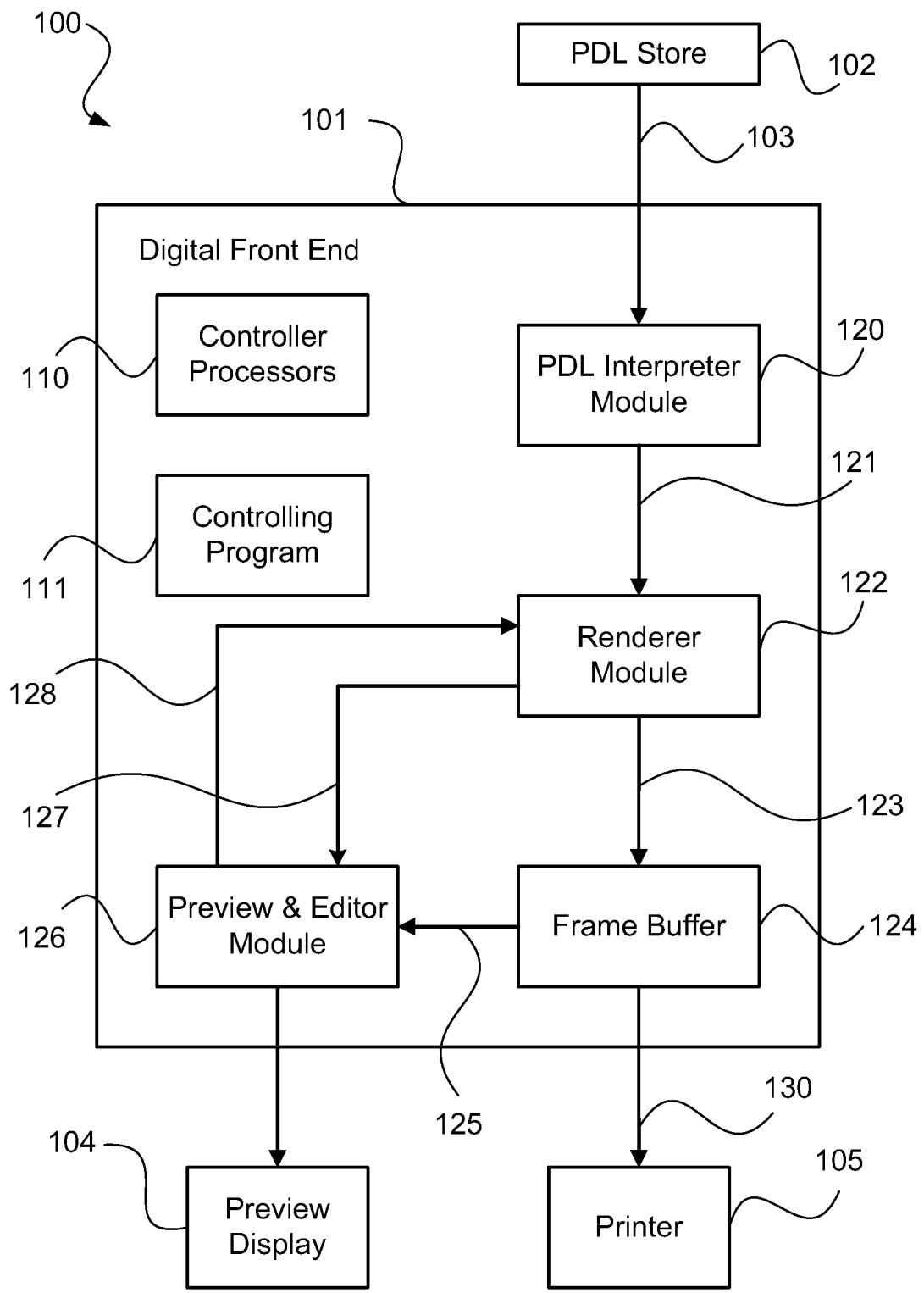
FIG. 1 schematically represents a software architecture for a Digital Front End of a printing system according to the present disclosure.

FIG. 1 shows a high-level software architecture 100 for the previewing, editing and printing a printable document 103 using the Digital Front End (DFE) 101. Each of a number of modules 120, 122, 124 and 126 of the DFE 101, to be described, may be formed by one or more of the code modules of a controlling program 111 that is executed by one or more controller processors 110 of the DFE 101.

A PDL Store 102 provides the printable document 103 to the Digital Front End 101. The document 103 is then rendered and displayed on a preview display 104. The user can then edit the document using the digital front end 101 and the preview display 104 is updated with the changes as made by the user. When the user is satisfied with the or any changes to the document 103, the (edited) document 130, which is in a pixel-based form, is printed by a printer 105. The printable document 103 is typically provided in the form of a description of the printable pages 130, the description being specified using a Page Description Language (PDL), such as Adobe® PDF or Hewlett-Packard® PCL. The PDL provides descriptions of graphic objects to be rendered in a rendering (or z) order. The PDL Store 102 is a storage unit which holds the printable document 103.

A PDL interpreter module 120 receives the printable document 103 and generates graphic objects 121. The digital front end 101 then uses a renderer module 122 to render the graphic objects 121 to pixel data values 123. The pixel data values 123 are placed in the frame buffer 124.

A user interface of the digital front end 101 runs on a preview and editor module 126. The preview and editor module 126 operates upon the rendered page bitmap 125 from the frame buffer 124. The preview and editor module 126 also receives page object information 127 from the renderer module 122. This page object information 127 is in an intermediate print format that is native to the Digital Front End 101 and, for example, may be a fillmap format. The preview and editor module 126 provides user edit information 128 back to the render module 122 which consequently renders the changes to the pixel data values 123. The collective functionality of the modules 104, 122, 124 and 126 together with the interconnections may be considered a "preview system interface loop."

Generally, the PDL interpreter module 120, renderer module 122, frame buffer 124 and preview and editor module 126 are implemented as one or more code modules of the controlling program 111 which is executed by the controller processors 110 within the Digital Front End 101. In some implementations, certain ones of those modules may be implemented in hardware, such as an application specific integrated circuit (ASIC), or field programmable gate array (FPGA).

High Level Description of the Renderer Module

Figure 2:
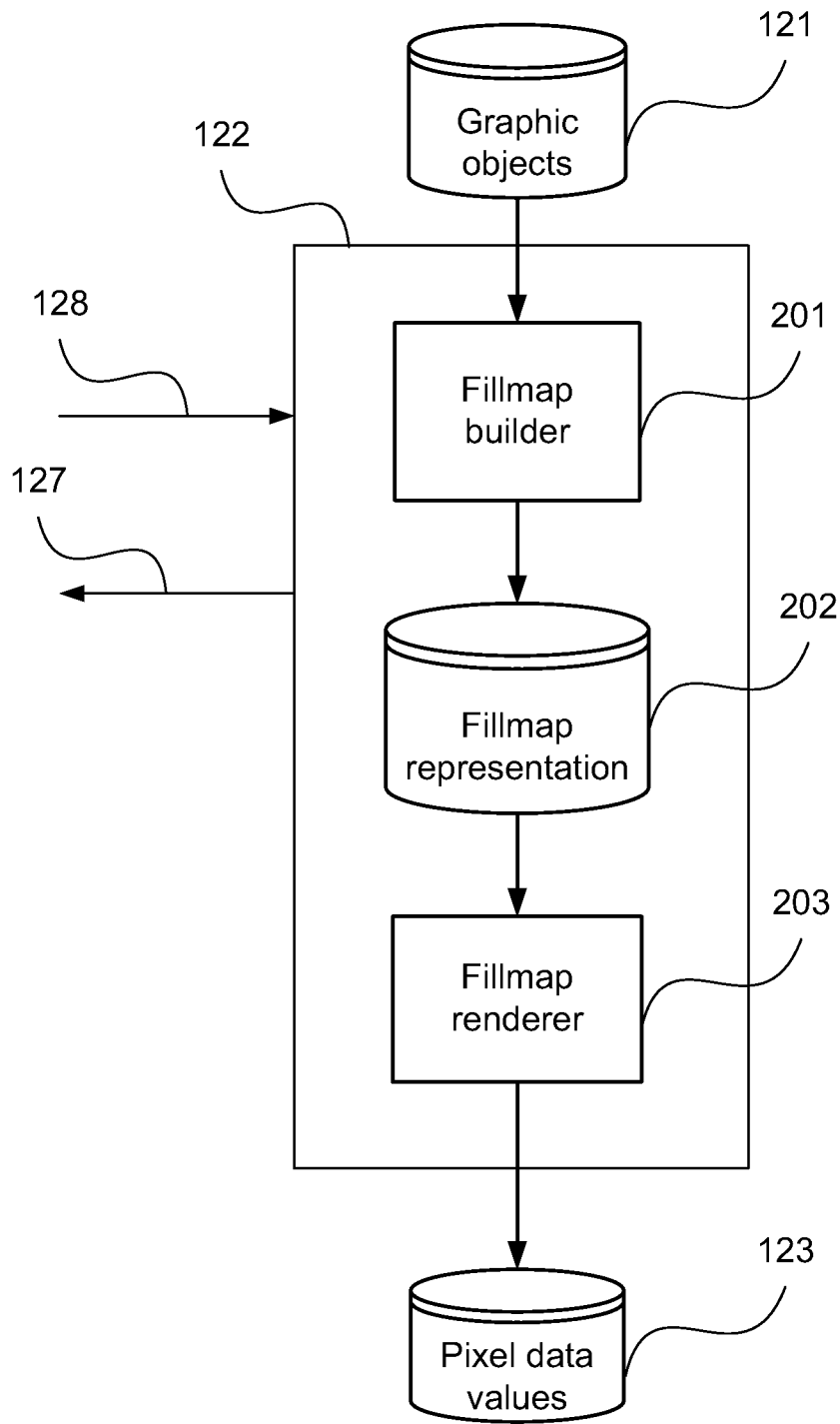
FIG. 2 is a schematic block diagram of a renderer module.

The renderer module 122 will now be described in more detail with reference to FIG. 2. The renderer module 122 operates to render the graphic objects 121 to pixel data values 123. The renderer module 122 includes a number of submodules, for which a first, being a fillmap builder 201, receives the graphic objects 121 in an order known in the art as z-order. The fillmap builder 201 converts the graphic objects 121 into an intermediate representation. In the preferred implementation, the intermediate print data representation is a fillmap representation 202, which is a rasterised region-based representation. The fillmap building process executed by the fillmap builder 201 will be described in more detail later with reference to FIGS. 3A, 3B, 4A and 4B.

A fillmap renderer 203 is a sub-module receives the fillmap representation 202 and renders the fillmap representation 202 to the pixel data values 123. The connections 127 and 128 between the renderer module 122 and the preview & editor module 126 provide for interaction between components of each of these modules, that interaction typically being exercised by software and signalling components of the two.

Description of the Fillmap Format

A fillmap representation of a graphical image such as a page, as generated by the Fillmap Builder module 201, will now be described in more detail. A fillmap is a region-based representation of a page. The fillmap maps a region of pixels within the page to a fill compositing sequence which will be composited to generate the colour data for each pixel within that fillmap region. Multiple fillmap regions within a fillmap can map to the same fill compositing sequence. Fillmap regions within the fillmap do not overlap and therefore each pixel in the rendered page only belongs to a single fillmap region. Each fillmap region within the fillmap is defined by a set of pixel-aligned fillmap edges which activate the fill compositing sequence associated with that fillmap region. Pixel-aligned fillmap edges are defined such that they:

(i) are monotonically increasing in the y-direction of the page;

(ii) do not intersect with each other;

(iii) are aligned with pixel boundaries, meaning that each pixel-aligned fillmap edge consists of a sequence of segments, each of which follows a boundary between two contiguous pixels;

(iv) contain a reference to the fill sequence required to be composited to render to pixels the fillmap region to which the pixel-aligned fillmap edge belongs; and (v) activate pixels within a single fillmap region.

In a preferred implementation, references to fill compositing sequences are indices into a table of fill compositing sequences.

On any given scan line, starting at a pixel-aligned fillmap edge which activates a fillmap region, and progressing in the direction of increasing x, the fillmap region remains active until a second pixel-aligned fillmap edge which activates a further fillmap region is encountered. When the second pixel-aligned fillmap edge is encountered, the active fillmap region is deactivated, and the fillmap region corresponding to the second pixel-aligned fillmap edge is activated. The part of the scanline in which a particular fillmap region is active, is known as a pixel-run.

Within a fillmap, the fill compositing sequence active within each fillmap region of pixels is stored in the table of fill compositing sequences. A fill compositing sequence (also referred to as an FCS) is a sequence of z-ordered levels, where each level contains attributes such as a fill, the opacity of the level, a compositing operator which determines how to mix the colour data of this level with other overlapping levels, and the priority, or z-order, of the level. A fill compositing sequence contains references to all the levels which contribute colour to the pixels within a fillmap region. The table of fill compositing sequences contains all of the fill compositing sequences required to render the page to pixels. The table of fill compositing sequences does not contain duplicate instances of identical fill compositing sequences. Hence, multiple fillmap regions within a fillmap which map to the same fill compositing sequence map to the same instance of the fill compositing sequence within the table of fill compositing sequences.

Figure 3A:
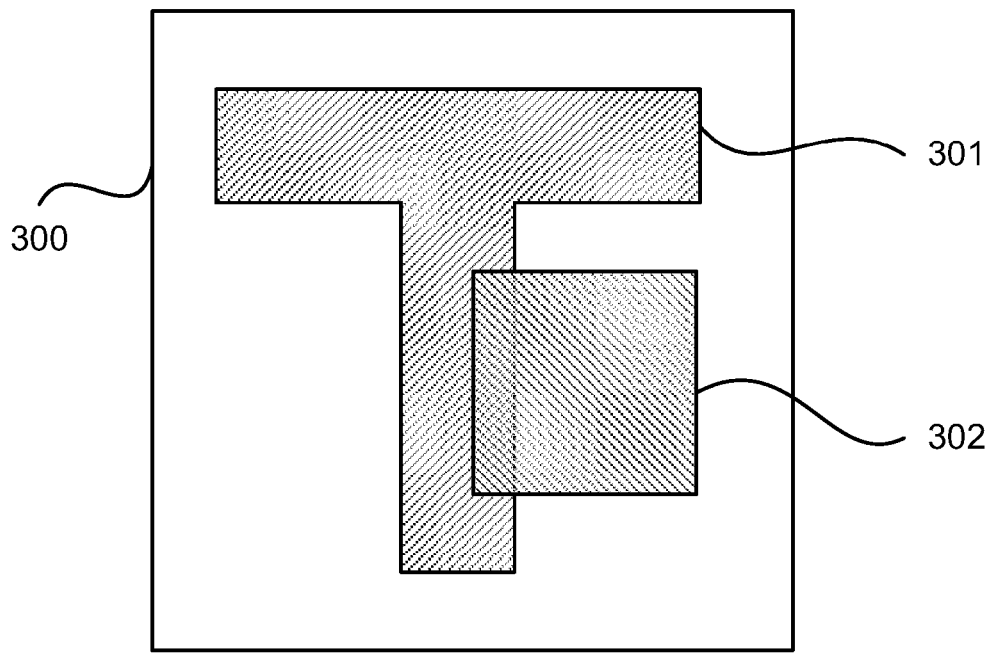
FIG. 3A shows an exemplary page with graphic objects.

The generation of a fillmap representation of a page will now be described with reference to FIGS. 3A, 3B, 4A and 4B. FIG. 3A shows a page representation 300. The page 300 has a white background and two graphic objects 301 and 302. The first graphic object 301 is an opaque "T" shaped object with a right-leaning hatched fill. The second graphic object 302 is a transparent square with a left-leaning hatched fill. Examples of other fills are gradients representing a linearly varying colour, bitmap images or tiled (i.e. repeated) images. The second graphic object 302 partially overlaps the first graphic object 301 and, by virtue of the transparency of the object 302, the object 301 can be seen in the region of overlap.

Figure 3B:
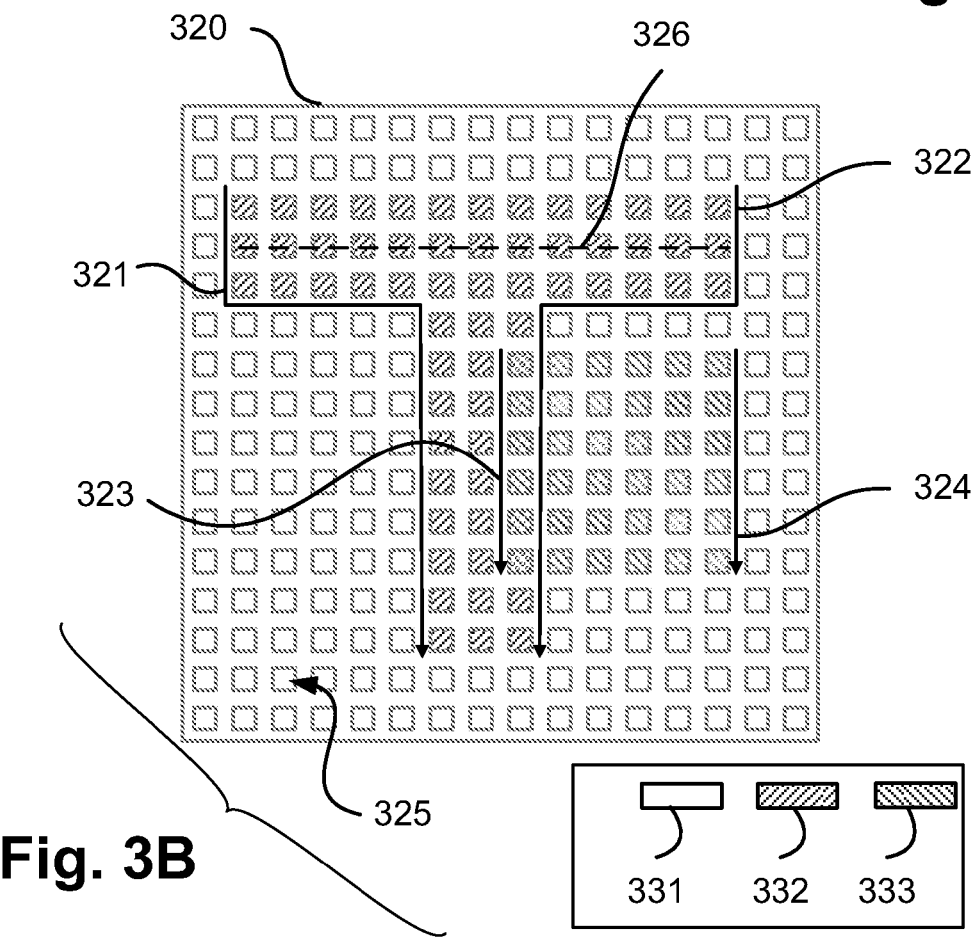
FIG. 3B shows the pixel-aligned object edges, and their associated fills, of the page of FIG. 3A.

FIG. 3B shows the decomposition of the graphic objects 301 and 302 of the page 300 into pixel-aligned graphic object edges, levels and fills according to a pixel grid 320. A graphic object is decomposed into two or more pixel-aligned object edges, a single level, and one or more fills. Pixel-aligned graphic object edges define the activation or deactivation of a level during rasterization. Pixel-aligned graphic object edges therefore refer to the level of the object from which they are derived. The first graphic object 301 is decomposed into two pixel-aligned graphic object edges 321 and 322, and a level 332 that consists of a right-leaning hatched fill. Pixel-aligned graphic object edges 321 and 322 refer to the level 332 of the first graphic object 301. The second graphic object 302 is decomposed into two pixel-aligned graphic object edges 323 and 324, and a level 333 that consists of a transparent left-leaning hatched fill. Pixel-aligned graphic object edges 323 and 324 refer to the level 333 of the second graphic object 302. The background 325 has a level 331 that consists of white fill. The dashed line 326 indicates a pixel run, and it is a collection of contiguous pixels lying on the same scan line which are activated by the same edge (in this case edge 321).

Figure 4A:
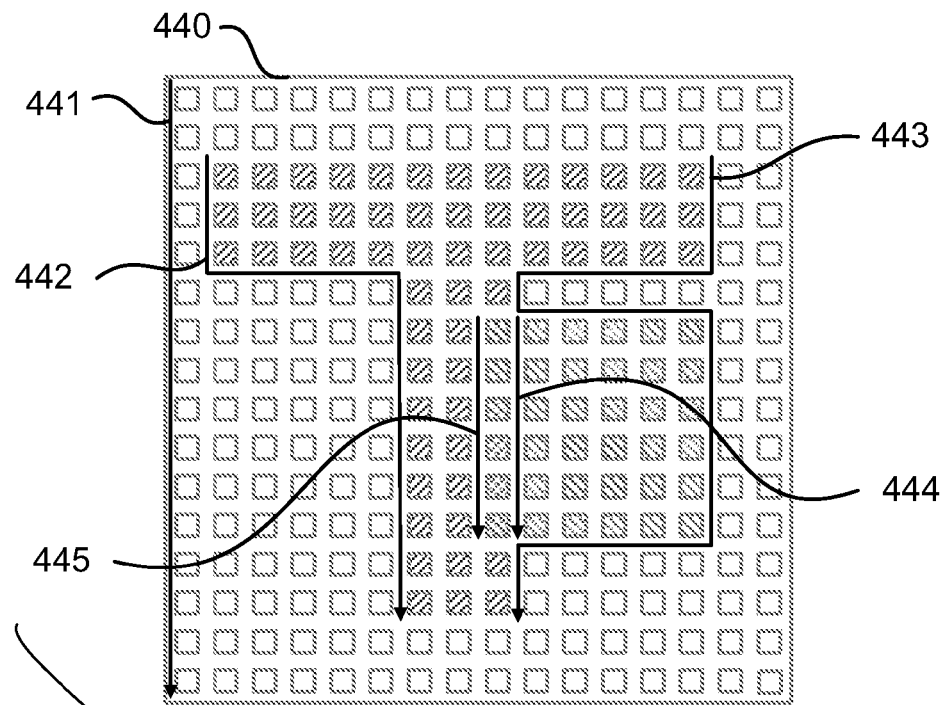
FIG. 4A shows a fillmap representation of the page of FIG. 3A.

FIG. 4A shows a fillmap representation 440 of the page 300 represented in FIG. 3A. The fillmap representation 440 is composed of five pixel-aligned fillmap edges, hereafter known simply as edges or fillmap edges 441-445. Each edge references a fill compositing sequence which will be used to determine the colour of each of the pixels activated by that edge. On any given scan line on which an edge is active, the edge will activate those pixels which are immediately to the right of the edge, until the next edge or a page boundary is encountered. The first edge 441 traces the left hand boundary of the page, and references a fill compositing sequence 451 which contains a single opaque level which is to be filled using the background fill. The second edge 442 traces the left hand boundary of the first graphic object 301, and references a fill compositing sequence 452 that contains a single level which is opaque and is to be filled using a right-leaning hatched fill. The third edge 443 references the same fill compositing sequence 451 as the first edge 441. The fourth edge 444 traces the left hand boundary of the region where the second object 302 overlaps the white background. The fourth edge 444 references a fill compositing sequence 454 which contains two levels. The top most level is transparent and is to be filled using a left-leaning hatched fill. The bottom most level is opaque and is to be filled using the background fill. The fifth edge 445 traces the left hand boundary of the region where the second graphic object 302 overlaps the first graphic object 301. The fifth edge 445 references a fill compositing sequence 453 which contains two levels. The top most level is transparent and is to be filled using a left-leaning hatched fill. The bottom most level is opaque and is to be filled using a right-leaning hatched fill.

Accompanying the representation 440 of the page is a table 450 of fill compositing sequences which, together with the representation 440, constitute the fillmap of the page 300. The table 450 of fill compositing sequences contains the fill compositing sequences 451, 452, 453 and 454 referenced by the edges contained in the representation 440 of the page.

Figure 4B:
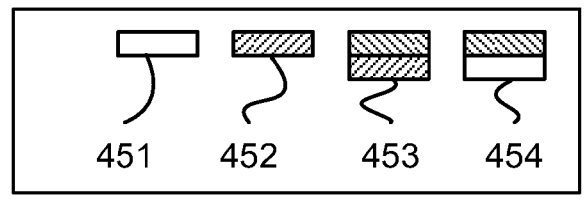
FIG. 4B shows a tiled fillmap representation of the page of FIG. 3A.
Figure 4B:
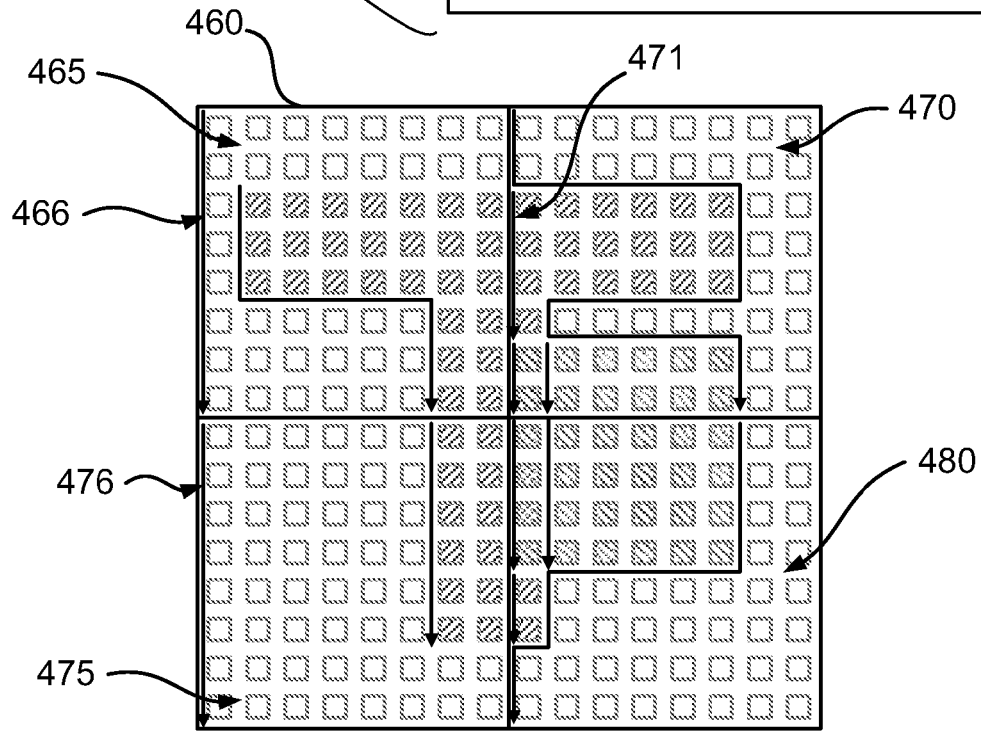

FIG. 4B shows a tiled fillmap representation 460 of the page represented in FIG. 3A. The tiled fillmap contains four tiles 465, 470, 475 and 480. Each tile has a height and width of eight pixels. In order to generate the tiled fillmap representation 460 of the page, the edges of the original fillmap representation 440 have been split across fillmap tile boundaries. For example, the edge 441 which traces the left hand boundary of the page in the untiled fillmap representation 440 shown in FIG. 4A has been divided into two edges 466 and 476. The first edge 466 activates pixels in the top-left hand tile 465, while the second edge 476 activates pixels in the bottom-left hand tile 475. Also, new edges have been inserted on the tile boundaries to activate the left most pixels of each tile which were previously activated by an edge in a tile to the left of the tile in which the pixels reside. For example, in the top-right tile 470 a new edge 471 has been inserted to activate pixels which were activated by the edge 442 which traces the left hand boundary of the first graphic object 301 in the original fillmap representation 440 shown in FIG. 4A.

In the preferred implementation, the fillmap representation and tiled fillmap representation stores edges in order of increasing start coordinate. More specifically, edges are sorted first by start y-value, and then edges with equal start y-value are sorted by start x-value. The start coordinate of an edge is the coordinate of the first pixel in the fillmap or fillmap tile that the edge activates, when pixels are traversed in scan line order and from left to right. For example, the start coordinate of edge 442 shown in FIG. 4A is (x=1, y=2), if the coordinate of the top-left pixel is (x=0, y=0). This edge 442 has a start x-value of 1, and a start y-value of 2. For example, with reference to the fillmap representation 460, edges will be stored in the order 441, 442, 443, 445, 444. In the preferred implementation, the remaining coordinates of the first pixel on each scan line activated by an edge are stored as a sequence of x-values with successive y-values beginning at the start y-value. Preferably, the sequence of x-values is further encoded using a method known in the art as "delta encoding". That is, each x-value is stored as the difference between the x-value and the previous x-value in the sequence of x-values of the corresponding edge. In a tiled fillmap representation, a separate list of edges is kept for each tile.

Overview

The inventions described here enable at least an editing system for a print-ready format to be constructed. While the inventions enable editing of the print-ready document, the present inventions are not limited to a particular user interface, and other user interfaces known in the art can be utilised to demonstrate the advantages of the present inventions.

The arrangements described here address the issues with the two approaches described in the Background above. Instead of using either the input print-ready format, or the rendered bitmap as the editing format, the presently described arrangements make use of an intermediate format, that is mid-way between the two. The preferred intermediate format used in the specific implementations, being the fillmap format, is optimised for rendering, yet retains important object information. This allows edits to precisely follow object edges. Because the fillmap format is optimised for rendering, a responsive user interface can be constructed using the fillmap format.

Further, since the intermediate format used by the various arrangements to perform the editing retains important object information, edits can precisely follow object edges, and the format is fast to render, thereby permitting a responsive user interface can be constructed.

Figure 16A:
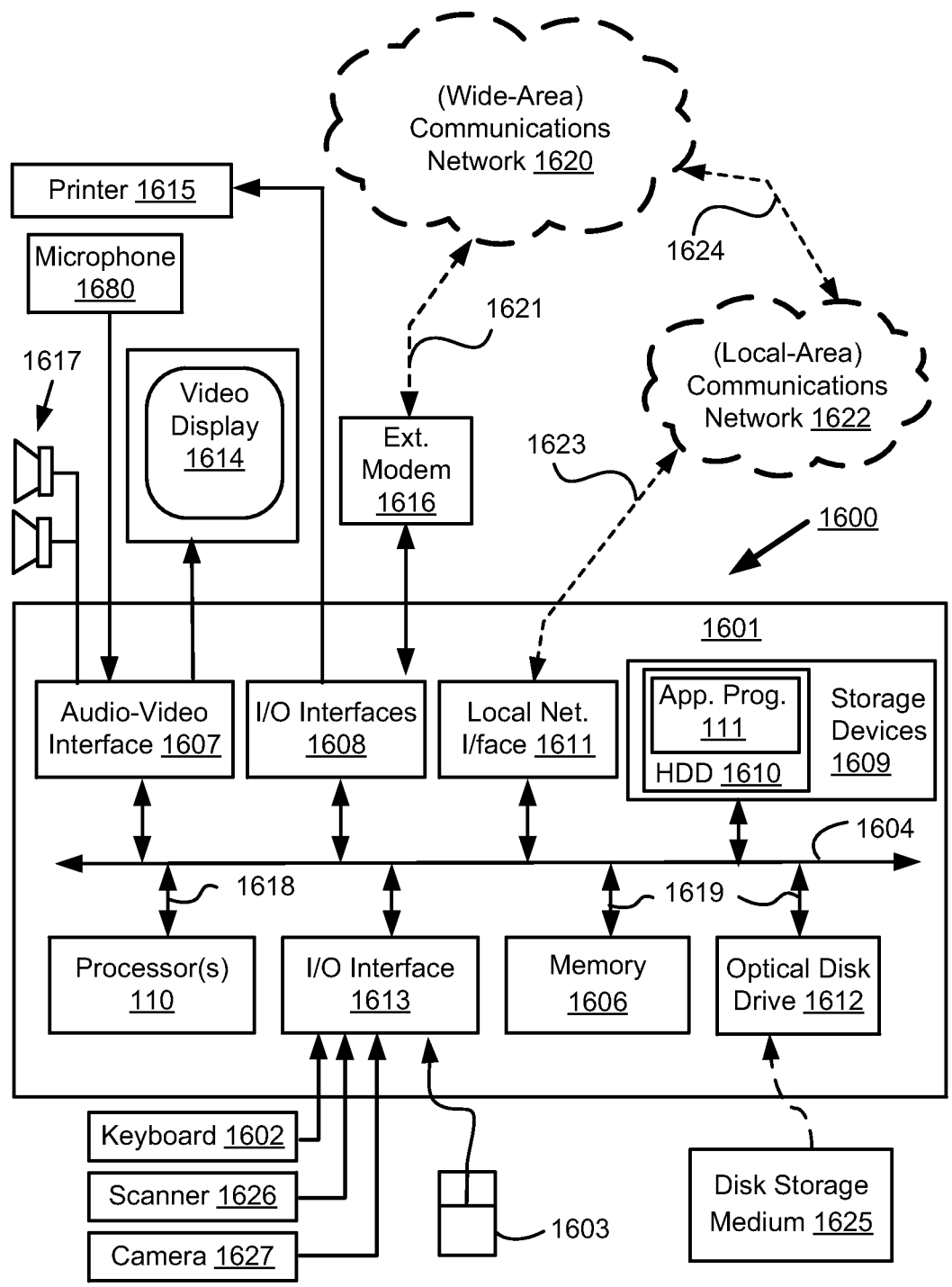
FIGS. 16A and 16B collectively form a schematic block diagram of a general purpose computer system upon which arrangements described can be practiced.
Figure 16B:
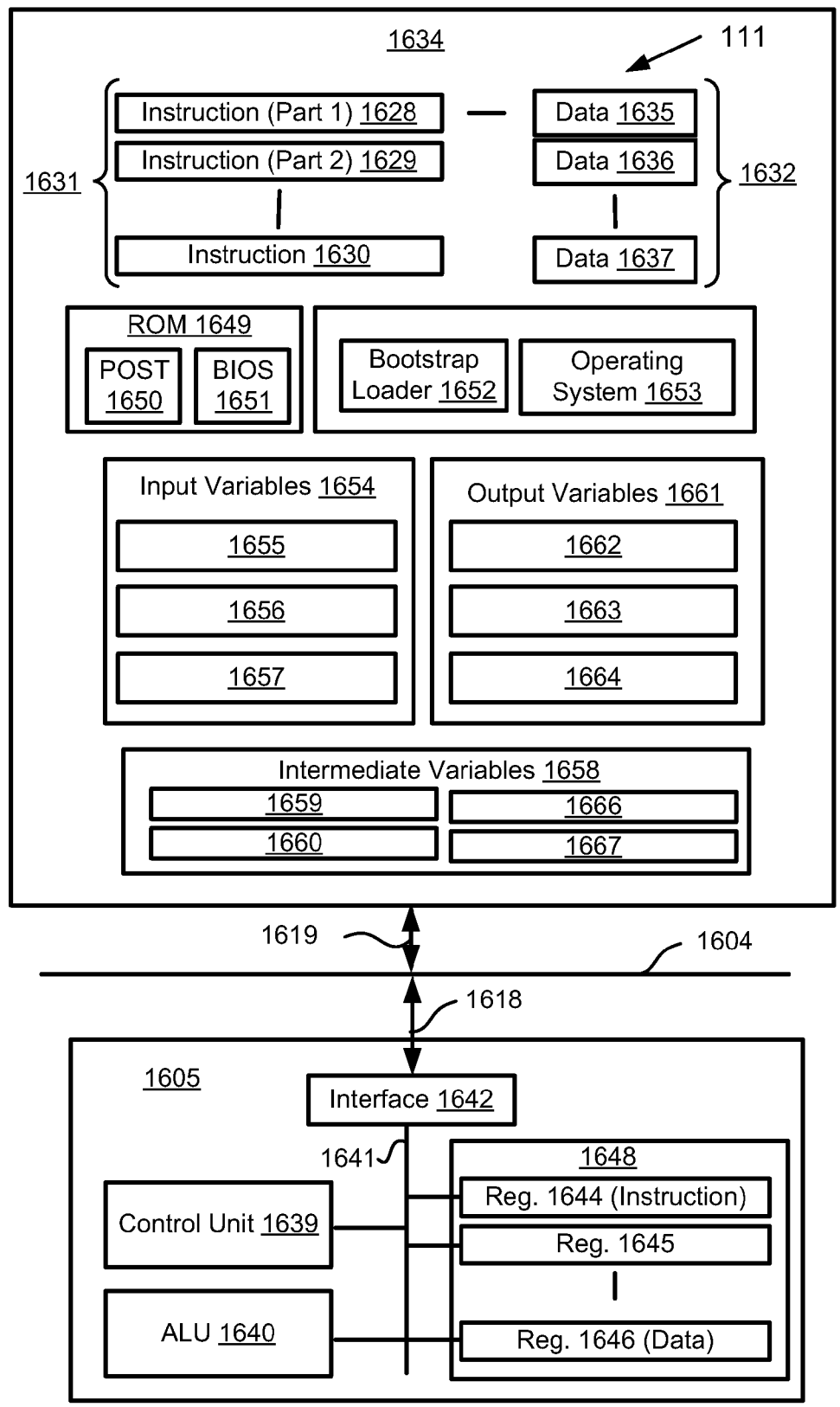

The arrangements to be described may be performed in the DFE 101, which is typically implemented using a general purpose computer system such as the system 1600 shown in FIGS. 16A and 16B. As seen in FIG. 16A, the computer system 1600 includes: a computer module 1601; input devices such as a keyboard 1602, a mouse pointer device 1603, a scanner 1626, a camera 1627, and a microphone 1680; and output devices including a printer 1615, a display device 1614 and loudspeakers 1617. An external Modulator-Demodulator (Modem) transceiver device 1616 may be used by the computer module 1601 for communicating to and from a communications network 1620 via a connection 1621. The communications network 1620 may be a wide-area network (WAN), such as the Internet, a cellular telecommunications network, or a private WAN. Where the connection 1621 is a telephone line, the modem 1616 may be a traditional "dial-up" modem. Alternatively, where the connection 1621 is a high capacity (e.g., cable) connection, the modem 1616 may be a broadband modem. A wireless modem may also be used for wireless connection to the communications network 1620.

The computer module 1601 typically includes at least one processor unit 110, and a memory unit 1606. For example, the memory unit 1606 may have semiconductor random access memory (RAM) and semiconductor read only memory (ROM). The computer module 1601 also includes an number of input/output (I/O) interfaces including: an audio-video interface 1607 that couples to the video display 1614, loudspeakers 1617 and microphone 1680; an I/O interface 1613 that couples to the keyboard 1602, mouse 1603, scanner 1626, camera 1627 and optionally a joystick or other human interface device (not illustrated); and an interface 1608 for the external modem 1616 and printer 1615. In some implementations, the modem 1616 may be incorporated within the computer module 1601, for example within the interface 1608. The computer module 1601 also has a local network interface 1611, which permits coupling of the computer system 1600 via a connection 1623 to a local-area communications network 1622, known as a Local Area Network (LAN). As illustrated in FIG. 16A, the local communications network 1622 may also couple to the wide network 1620 via a connection 1624, which would typically include a so-called "firewall" device or device of similar functionality. The local network interface 1611 may comprise an Ethernet circuit card, a Bluetooth® wireless arrangement or an IEEE 802.11 wireless arrangement; however, numerous other types of interfaces may be practiced for the interface 1611.

The I/O interfaces 1608 and 1613 may afford either or both of serial and parallel connectivity, the former typically being implemented according to the Universal Serial Bus (USB) standards and having corresponding USB connectors (not illustrated). Storage devices 1609 are provided and typically include a hard disk drive (HDD) 1610. Other storage devices such as a floppy disk drive and a magnetic tape drive (not illustrated) may also be used. An optical disk drive 1612 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1600.

The components 110 to 1613 of the computer module 1601 typically communicate via an interconnected bus 1604 and in a manner that results in a conventional mode of operation of the computer system 1600 known to those in the relevant art. For example, the processor 110 is coupled to the system bus 1604 using a connection 1618. Likewise, the memory 1606 and optical disk drive 1612 are coupled to the system bus 1604 by connections 1619. Examples of computers on which the described arrangements can be practised include IBM-PC's and compatibles, Sun Sparcstations, Apple Mac™ or a like computer systems.

The methods of modifying or editing a displayed graphical representation of a document may be implemented using the computer system 1600 wherein the processes of FIGS. 5 to 15, to be described, may be implemented as one or more software application programs 111 executable within the computer system 1600. In particular, the steps of the methods of modifying or editing a displayed graphical representation of a document are effected by instructions 1631 (see FIG. 16B) in the software 111 that are carried out within the computer system 1600. The software instructions 1631 may be formed as one or more code modules, each for performing one or more particular tasks. The software may also be divided into two separate parts, in which a first part and the corresponding code modules performs the modifying or editing methods and a second part and the corresponding code modules manage a user interface between the first part and the user.

The software may be stored in a computer readable medium, including the storage devices described below, for example. The software is loaded into the computer system 1600 from the computer readable medium, and then executed by the computer system 1600. A computer readable medium having such software or computer program recorded on the computer readable medium is a computer program product. The use of the computer program product in the computer system 1600 preferably effects an advantageous apparatus for modifying or editing a displayed graphical representation of a document.

The software 111 is typically stored in the HDD 1610 or the memory 1606. The software is loaded into the computer system 1600 from a computer readable medium, and executed by the computer system 1600. Thus, for example, the software 111 may be stored on an optically readable disk storage medium (e.g., CD-ROM) 1625 that is read by the optical disk drive 1612. A computer readable medium having such software or computer program recorded on it is a computer program product. The use of the computer program product in the computer system 1600 preferably effects an apparatus for modifying or editing a displayed graphical representation of a document.

In some instances, the application programs 111 may be supplied to the user encoded on one or more CD-ROMs 1625 and read via the corresponding drive 1612, or alternatively may be read by the user from the networks 1620 or 1622. Still further, the software can also be loaded into the computer system 1600 from other computer readable media. Computer readable storage media refers to any non-transitory tangible storage medium that provides recorded instructions and/or data to the computer system 1600 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 1601. Examples of transitory or non-tangible computer readable transmission media that may also participate in the provision of software, application programs, instructions and/or data to the computer module 1601 include radio or infra-red transmission channels as well as a network connection to another computer or networked device, and the Internet or Intranets including e-mail transmissions and information recorded on Websites and the like.

The second part of the application programs 111 and the corresponding code modules mentioned above may be executed to implement one or more graphical user interfaces (GUIs) to be rendered or otherwise represented upon the display 1614. Through manipulation of typically the keyboard 1602 and the mouse 1603, a user of the computer system 1600 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1617 and user voice commands input via the microphone 1680.

FIG. 16B is a detailed schematic block diagram of the processor 110 and a "memory" 1634. The memory 1634 represents a logical aggregation of all the memory modules (including the HDD 1609 and semiconductor memory 1606) that can be accessed by the computer module 1601 in FIG. 16A.

When the computer module 1601 is initially powered up, a power-on self-test (POST) program 1650 executes. The POST program 1650 is typically stored in a ROM 1649 of the semiconductor memory 1606 of FIG. 16A. A hardware device such as the ROM 1649 storing software is sometimes referred to as firmware. The POST program 1650 examines hardware within the computer module 1601 to ensure proper functioning and typically checks the processor 110, the memory 1634 (1609, 1606), and a basic input-output systems software (BIOS) module 1651, also typically stored in the ROM 1649, for correct operation. Once the POST program 1650 has run successfully, the BIOS 1651 activates the hard disk drive 1610 of FIG. 16A. Activation of the hard disk drive 1610 causes a bootstrap loader program 1652 that is resident on the hard disk drive 1610 to execute via the processor 110. This loads an operating system 1653 into the RAM memory 1606, upon which the operating system 1653 commences operation. The operating system 1653 is a system level application, executable by the processor 110, to fulfill various high level functions, including processor management, memory management, device management, storage management, software application interface, and generic user interface.

The operating system 1653 manages the memory 1634 (1609, 1606) to ensure that each process or application running on the computer module 1601 has sufficient memory in which to execute without colliding with memory allocated to another process. Furthermore, the different types of memory available in the system 1600 of FIG. 16A must be used properly so that each process can run effectively. Accordingly, the aggregated memory 1634 is not intended to illustrate how particular segments of memory are allocated (unless otherwise stated), but rather to provide a general view of the memory accessible by the computer system 1600 and how such is used.

As shown in FIG. 16B, the processor 110 includes a number of functional modules including a control unit 1639, an arithmetic logic unit (ALU) 1640, and a local or internal memory 1648, sometimes called a cache memory. The cache memory 1648 typically includes a number of storage registers 1644-1646 in a register section. One or more internal busses 1641 functionally interconnect these functional modules. The processor 110 typically also has one or more interfaces 1642 for communicating with external devices via the system bus 1604, using a connection 1618. The memory 1634 is coupled to the bus 1604 using a connection 1619.

The application program 111 includes a sequence of instructions 1631 that may include conditional branch and loop instructions. The program 111 may also include data 1632 which is used in execution of the program 111. The instructions 1631 and the data 1632 are stored in memory locations 1628, 1629, 1630 and 1635, 1636, 1637, respectively. Depending upon the relative size of the instructions 1631 and the memory locations 1628-1630, a particular instruction may be stored in a single memory location as depicted by the instruction shown in the memory location 1630. Alternately, an instruction may be segmented into a number of parts each of which is stored in a separate memory location, as depicted by the instruction segments shown in the memory locations 1628 and 1629.

In general, the processor 110 is given a set of instructions which are executed therein. The processor 110 waits for a subsequent input, to which the processor 110 reacts to by executing another set of instructions. Each input may be provided from one or more of a number of sources, including data generated by one or more of the input devices 1602, 1603, data received from an external source across one of the networks 1620, 1622, data retrieved from one of the storage devices 1606, 1609 or data retrieved from a storage medium 1625 inserted into the corresponding reader 1612, all depicted in FIG. 16A. The execution of a set of the instructions may in some cases result in output of data. Execution may also involve storing data or variables to the memory 1634.

The disclosed modifying or editing arrangements use input variables 1654, which are stored in the memory 1634 in corresponding memory locations 1655, 1656, 1657. The modifying or editing arrangements produce output variables 1661, which are stored in the memory 1634 in corresponding memory locations 1662, 1663, 1664. Intermediate variables 1658 may be stored in memory locations 1659, 1660, 1666 and 1667.

Referring to the processor 110 of FIG. 16B, the registers 1644, 1645, 1646, the arithmetic logic unit (ALU) 1640, and the control unit 1639 work together to perform sequences of micro-operations needed to perform "fetch, decode, and execute" cycles for every instruction in the instruction set making up the program 111. Each fetch, decode, and execute cycle comprises:
 (i) a fetch operation, which fetches or reads an instruction 1631 from a memory location 1628, 1629, 1630;
 (ii) a decode operation in which the control unit 1639 determines which instruction has been fetched; and
 (iii) an execute operation in which the control unit 1639 and/or the ALU 1640 execute the instruction.

Thereafter, a further fetch, decode, and execute cycle for the next instruction may be executed. Similarly, a store cycle may be performed by which the control unit 1639 stores or writes a value to a memory location 1632.

Each step or sub-process in the processes of FIGS. 5 to 15. is associated with one or more segments of the program 111 and is performed by the register section 1644, 1645, 1646, the ALU 1640, and the control unit 1639 in the processor 110 working together to perform the fetch, decode, and execute cycles for every instruction in the instruction set for the noted segments of the program 111.

As noted above, the method of modifying or editing a displayed graphic representation of a document may alternatively be implemented in dedicated hardware such as one or more integrated circuits performing the functions or sub functions to be described and which may be configured within the computer module 1601. Such dedicated hardware may include graphic processors, digital signal processors, or one or more microprocessors and associated memories.

First Example Implementation

A first implementation of a process which enables the preview system interface loop is now described. In the example used to described this implementation, the user has chosen to modify the colour of an entire object on the input PDL page. A use case for this type of editing change would be to adjust for minor colour shifts caused by a raster image processor (RIP) or other printing processes.

Figure 5:
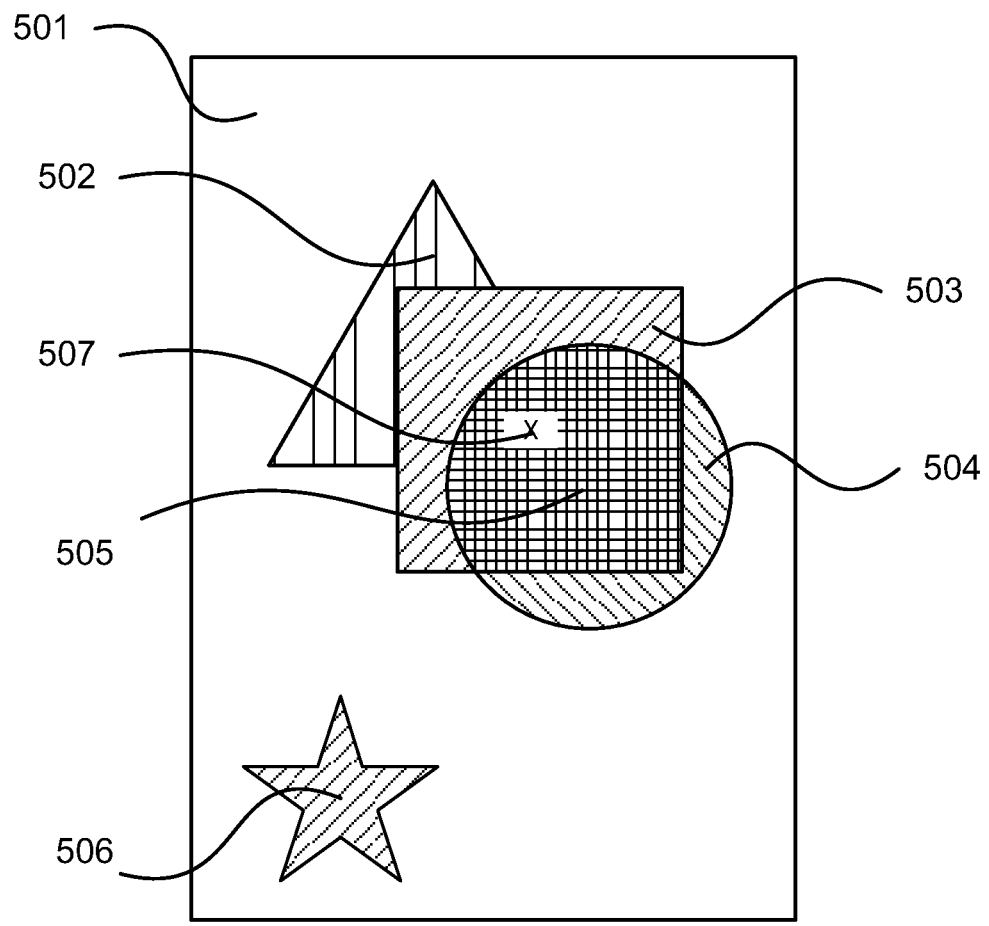
FIG. 5 is an example input PDF page with graphical objects.

As an example to illustrate the functioning of the first implementation, an example input PDL page is shown in FIG. 5. FIG. 5 shows three objects 502, 503 and 504 grouped together on the input PDL page 501. Those objects are a triangle 502 with one colour, a fully opaque square 503 coloured with a second colour partially covering the triangle 502, and a partially transparent circle 504 coloured with a third colour, partially covering the square 503. The PDL page 501 also includes a star object 506, separated from the other grouped objects 502, 503 and 504. The star object 506 has the same colour as the square 503.

A region on the page 501 formed by the overlap of the square 503 and the circle 504 has a fourth colour, formed by the blending of the colour of the square 503 with the colour of the partially transparent circle 504. This region is marked 505 in FIG. 5. In this example, the user is not satisfied with the colour of the region 505, and the user selects a point 507 indicating where the colour should be changed. The point 507 is typically a pixel, being a representative colour element of the user's selected region of interest (region 505) which is desired for modification and editing. Further, the region 505 represents one identified portion of the page 501 that is defined by a certain compositing combination of the objects 502-504 and 506, and for which other portions also exist as defined by different compositing combinations of the objects. Those different portions will become apparent through the following description and the representations of FIG. 6A to 9B.

Figure 10:
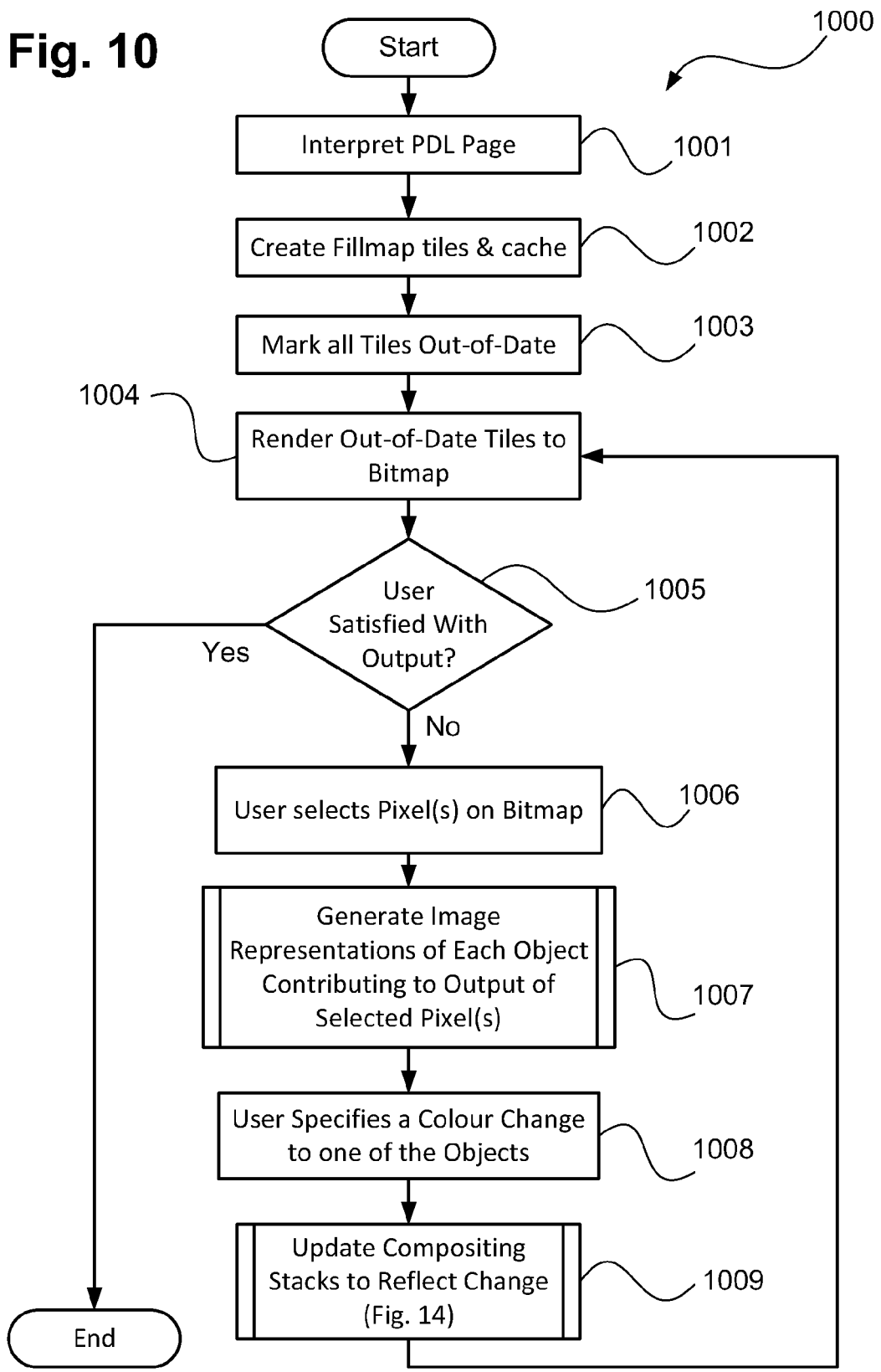
FIG. 10 is a schematic flow diagram illustrating the processing steps of the first and second implementations.

FIG. 10 describes how the first implementation functions, by way of a flowchart of a process 1000 preferably represented by software and forming part of the controlling program 111, stored in the HDD 1610, and executed by the controller processors 110. In a first step 1001, the printable document 103 is read from the PDL Store 102, which may be formed in the HDD 1610, and one of the document pages is interpreted into graphical objects 121 by the PDL interpreter module 120.

The processing then moves to step 1002, where the fillmap builder 201 generates fillmap tiles (e.g. 465,470, 475 and 480) from the graphical objects 121. The fillmap tiles created in step 1002 are stored in a cache typically associated with the controlling processors 110 and/or the memory 1606.

The process 1000 then moves to step 1003 where all the fillmap tiles stored in the cache are marked as out-of-date, as none have yet been rendered to pixels in the output frame buffer 124. The process 1000 then moves to step 1004 where all tiles that have been marked as out-of-date are rendered to pixels by the fillmap renderer 203. To render the fillmap, the fillmap renderer 203 progresses through the page and computes the colour of each Fill Compositing Sequence (FCS) associated with an edge, and then produces pixels of that colour for the pixel run associated with the edge. All rendered tiles are then marked as up-to-date. The result of step 1004 is a complete rendered bitmap of pixel data values 123 containing the rendered page contents. These pixel data values 123 are stored in the frame buffer 124, which is typically formed within the memory 1606 or the HDD 1610.

The process 1000 then moves to step 1005. In step 1005, the rendered bitmap is presented to the user by the preview and editor module 126 using the preview display 104 as reproduced on the video display device 1614 within an appropriately configured Graphical User Interface (GUI). Via the GUI, the user can indicate, possibly through operation of the keyboard 1602 or mouse 1603, if the user is satisfied with the rendered output. If the user is satisfied with the rendered output, as detected from a corresponding GUI response at step 1005, the bitmap is ready to be printed by the printer 105 and the process 1000 concludes.

If the user is not satisfied with the rendered output, as detected from a corresponding GUI response at step 1005, the process 1000 moves to step 1006. In step 1006, the user indicates a pixel, or a plurality of pixels, such as a region, on the rendered output where he/she is not satisfied with the colour. The pixel(s) can be preferably selected, for example, by interacting with the mouse 1603 or, in another implementation, a touch screen, where the display device 1614, keyboard 1602 and mouse 1603 are unitarily formed. Other GUI interactions may also be used. The GUI associated with the preview and editor module 126 operates for identifying the selection of the pixel(s) as the user's intention for a modifying operation to modify the graphics content of the currently displayed graphical representation of the document 103. Note that for step 1006, the user may identify a region of interest form modification by selecting a single pixel, for example by click a mouse pointer at the pixel location, or by scribing the region of interest using the mouse point to form a bounding box of multiple pixels. From such a bounding box, the module 126 may then infer a specific single pixel location, such as a centre pixel, as defining the specific region of interest of the user.

Figure 6A:
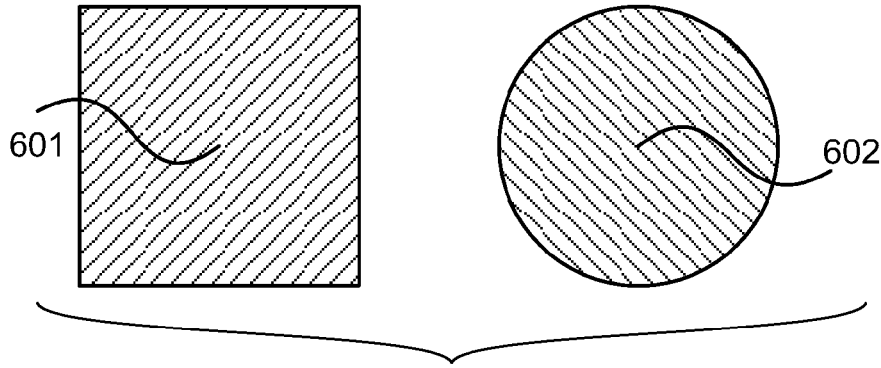
FIG. 6A is a diagram showing the objects displayed to the user when in full object mode.

The process 1000 then moves to step 1007. In step 1007, image representations of all page objects contributing to the output of the pixel(s) selected by the user are generated by the render module 122. A preferred approach of how this step can be done is explained below with reference to FIG. 11. An example of the results of this step is shown in FIG. 6A. FIG. 6A shows the results of processing the input page shown in FIG. 5 and for the selected pixel 507. Desirably, the image representations of FIG. 6A, for example, are displayed in the preview display 104 independently of the page image (for example in split windows) so that the user can readily compare the contributing objects against the totality of objects according to the current compositing sequence of all objects for the page. In this fashion, the GUI of the module 126 may display FIG. 6A alongside FIG. 5. The results of step 1007 are two images 601 and 602 representing the contributing objects at pixel 507. The image 601 represents the coloured square object 503 from the input PDL page, and image 602 represents the differently coloured circle object 504 from the input PDL page.

The processing then moves to step 1008. In this step the object images generated in step 1007 are presented to the user by the preview and editor module 126, for example via the GUI represented by the display 1614. The user selects one of the objects, and then specifies a colour change to the selected object, this being one class of modifying operation, for example by manipulation of the mouse 1603, keyboard 1602 and/or a touch panel interface. The preview and editor module 126 provides details of the user change to the renderer module 122, for example via the connection 128.

The processing then moves to step 1009. In this step, the render module 122 modifies the page compositing stacks to reflect the change specified by the user. Particularly this involves updating a compositing sequence of at least one pixel run affected by the representative colour element using the adjusted colour of the contributing object. A preferred approach of how this can be done is further explained with reference to FIG. 14 below. The process 1000 then loops back to step 1004.

Figure 11:
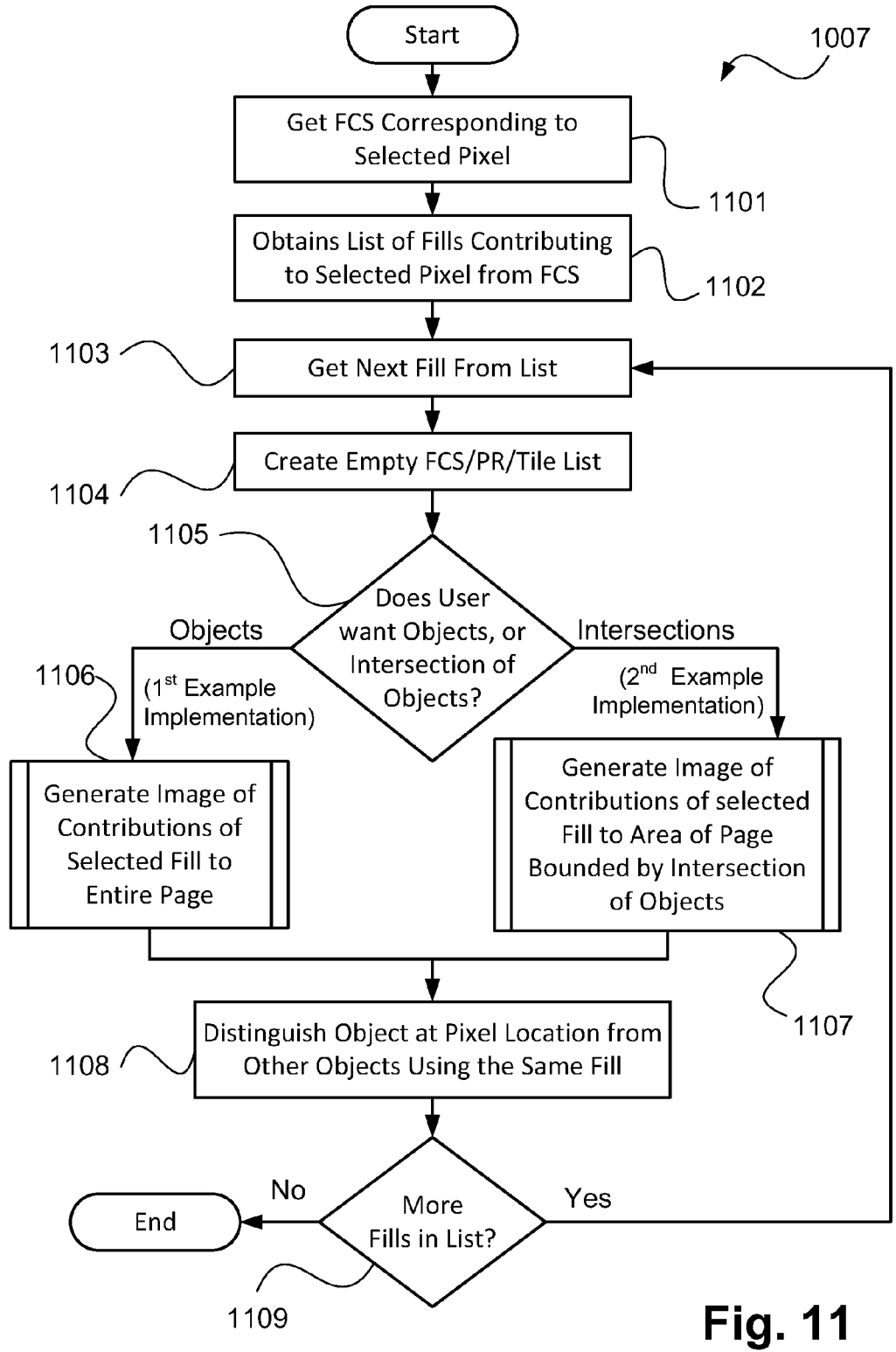
FIG. 11 is a schematic flow diagram illustrating a method of generating image representations of the objects contributing to the output of the selected pixel.

FIG. 11 details a preferred process of generating image representations of objects contributing to the output of the pixel selected by the user as performed at step 1007.

The processing of step 1007 starts at step 1101. In step 1101 the fillmap tile which contains the pixel selected by the user is located by examining the top-left starting co-ordinates of each tile in turn to find the one which contains the selected pixel. The FCS (Fill Compositing Sequence) for the selected pixel is obtained by iterating through the edges in the obtained tile to locate the edge which activates the selected pixel. The desired FCS of the selected pixel is obtained from the located edge. The edge which activates the selected pixel is determined by examining co-ordinates of the selected pixel and co-ordinates of the edges in the obtained tile. The processing of step 1007 then moves to step 1102. In step 1102, the FCS of the selected pixel is scanned to obtain the list of fills which contribute to the selected pixel: each layer in the FCS corresponds to a fill, and they are ordered in z-order, with the first element in the list being the lowest layer in z-order.

The processing then moves to step 1103 where the next fill in the list of fills constructed in step 1102 is selected. If a fill has not yet been selected, then the first fill in the list is selected.

The process of step 1007 then moves to step 1104 where an empty FCS/Pixel-Run/Tile list is created. This list, once ultimately constructed, will contain those FCSs which contribute to the object image being generated in steps 1106 or 1107. Each FCS in the list will further contain a list of pixel runs which reference the FCS and each of these pixel runs will reference the tile that contains the pixel run.

The processing of step 1007 then moves to decision point 1105. In this decision point, a different path is followed depending on whether the user has chosen to modify entire objects, or intersection of objects. In this first example implementation the user is deemed to have chosen to modify entire objects, so the processing now moves to step 1106. In step 1106, an image is generated of the contribution of the currently selected fill to the entire page by examining every pixel run in the page to find those that reference the currently selected fill and producing an image using only those pixel runs. Detail of how step 1106 is preferably performed is further explained with reference to FIG. 12.

An example of the results of executing step 1106 for the page 501 and selected pixel 507 shown in FIG. 5 is now given. The first time through the loop in FIG. 11, the result will look like FIG. 7A. Because the square 503 and the star 506 on FIG. 5 both have the same colour, the image generated by this step will include the square (item 701) and the star (item 702). The second time through the loop, the result will look like FIG. 7B. The image generated will have a single object, a circle (item 711).

The process of step 1007 next moves to step 1108 where the object at the selected pixel location is distinguished from other objects using the same fill. The need for this step is demonstrated by the example output given in FIG. 7A. Both the star (506) and the square (503) use the same colour, so the Fillmap Compositing Stacks for both objects reference the same fill data. Thus when step 1106 generates the contribution of this fill to the page, the resulting image will include both the star and the square. The user selected pixel 507 was located inside the square 503, so the square 503 is the object that needs to be isolated. There are several possible methods of doing this step. One simple method is to use the well-known flood-fill algorithm to locate the boundaries of the object that covers the selected pixel. Note that there is no need to search further through the whole page once the boundaries of the object containing the selected pixel has been determined.

Finally the processing moves to a decision point 1109. If there are unprocessed fills in the list of fills generated in step 1102 then the processing loops back to step 1103. Otherwise, the processing stops and step 1007 concludes.

Figure 12:
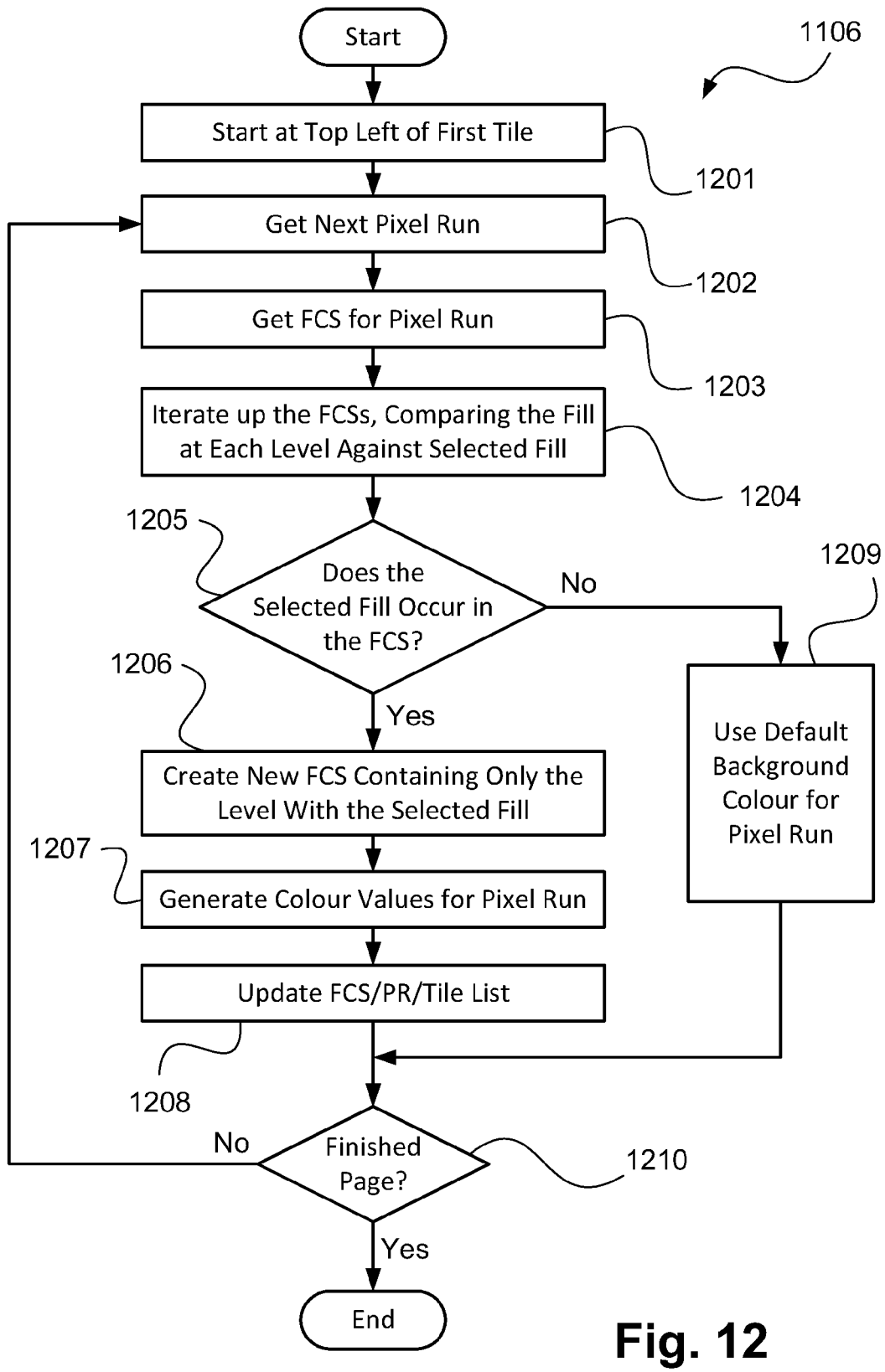
FIG. 12 is a schematic flow diagram illustrating a method of generating an image of the contributions of a selected fill to the entire page.

FIG. 12 details a preferred process of generating an image of the contribution of a selected fill to the entire page performed at step 1106.

The process of step 1106 starts at step 1201 where a current location for processing is set at the top left of the page, which is the top left of the first fillmap tile. The process of step 1106 then moves to step 1202, where the pixel run starting at the current location is selected. A pixel run begins at a fillmap edge, and continues for as long as the fillmap region is active, that is until a next edge is encountered, or the end of the tile is reached. An example of a pixel run is the dashed line 326 shown on FIG. 3B. The processing then moves to step 1203 where the FCS (Fill Compositing Sequence) for the selected pixel run is obtained.

The processing of step 1106 then moves to step 1204. In step 1204, the obtained FCS is examined traversing the FCS, and the fill at each level of the FCS is compared against the selected fill. The FCS is typically formed as a list, giving the ability to access either end of the list. Typically, access will be at the bottom of the list whereupon step 1204 operates to iterate up the FCS. The processing then moves to the decision point 1205 where a different path is chosen depending on whether or not the selected fill was located in the obtained FCS.

If the selected fill was not located in the obtained FCS (step 1205, No), then the processing moves to step 1209. In this step, a default background colour is generated for the pixel run. What background colour is chosen would depend on details of the user interface, and could for example be white. Alternatively, an alpha mask could be used to indicate the background. The processing then moves to the decision point 1210.

If the selected fill was located in the obtained FCS in step 1205 (Yes), then the processing moves to step 1206. In step 1206, a new FCS is constructed for the current pixel run, being that selected in step 1202. This new FCS contains only a single level containing the selected fill. The processing then moves to step 1207 where the newly constructed FCS is used to generate colour values for the pixel run. These colour values are generated using the fillmap rendering method as described above with reference to step 1004. Note that once this step is complete, the newly constructed FCS can, and preferably, should be discarded, so the original fillmap structure is unaffected.

The processing of step 1106 then moves to step 1208. In step 1208, the FCS obtained in step 1203 is added to the FCS/Pixel-Run/Tile list created in step 1104, if the FCS does not already exist in this list. The pixel run and its associated tile are further added to the pixel-run list attached to this FCS in the FCS/Pixel-Run/Tile list. The processing then moves to the decision point 1210.

In the decision point 1210, if the just processed pixel run was the last pixel run in the last tile of the page, then the processing stops and the step 1106 concludes. Otherwise, if there are remaining pixel runs in the current tile, then the current location is set to the pixel following the current pixel run. If there are no remaining pixel runs in the current tile, then the current location is set to the top left of the next tile. The processing then loops back to step 1202.

Note that an alternative approach to traversing the page is to start from the tile containing the selected pixel 507 and progress up and down the page from that tile. When doing a sub-traversal up or down the page, when a scanline is encountered which has no FCSs containing the selected fill, then the sub-traversal can stop. This has the effect of searching for pixel runs in the vicinity of the region of interest, and particularly for extending the searching for pixel runs out of and about the region of interest, and stopping once no compositing sequence comprising the representative colour element is found on a scan line in the vicinity of the region of interest. For reasons of clarity, the above text describes the simpler case where the traversal algorithm progresses down the page from the top-left tile to the bottom-right tile, in a raster fashion.

Figure 14:
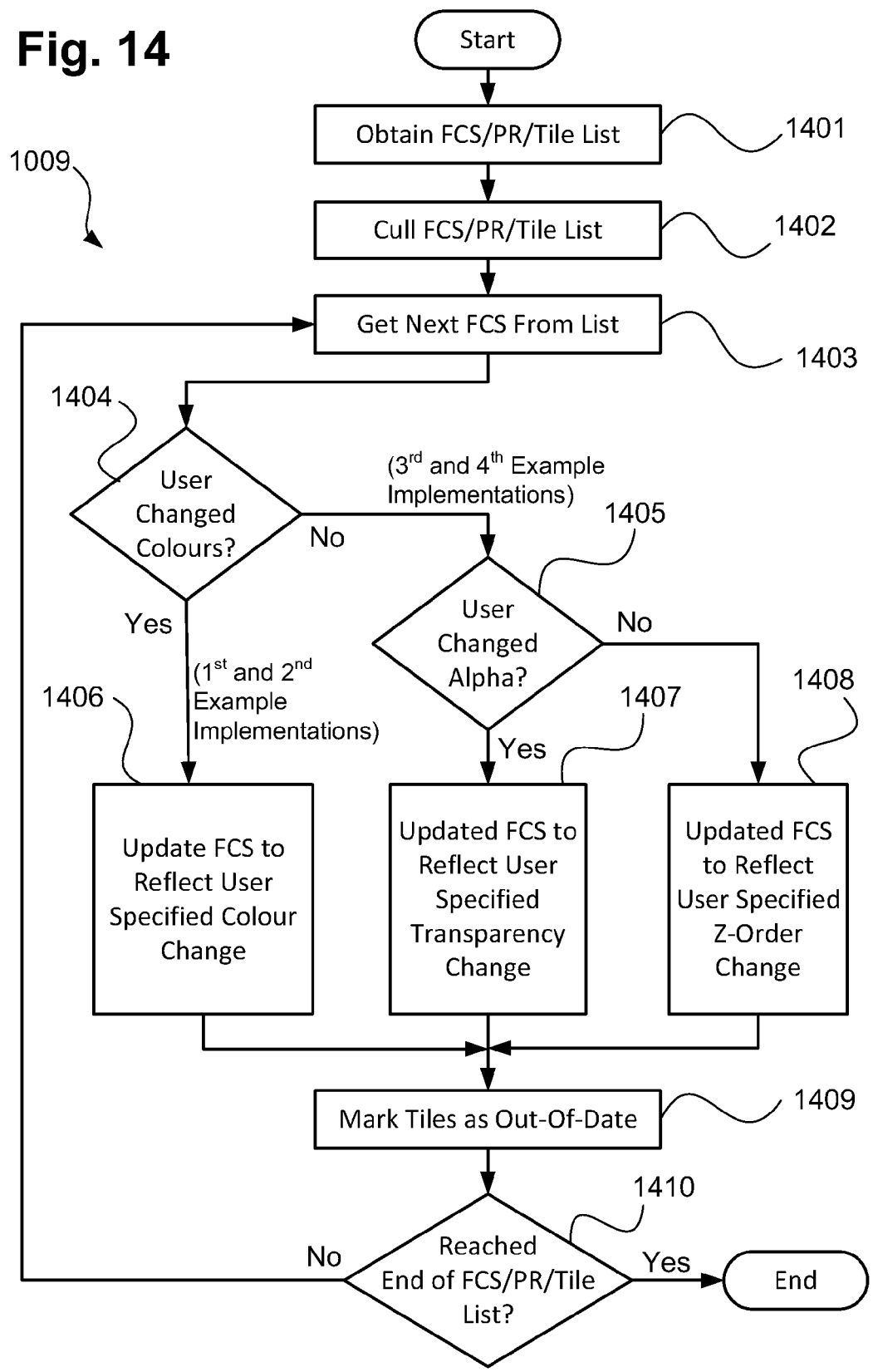
FIG. 14 is a schematic flow diagram illustrating a method of updating the page compositing stacks to reflect a change specified by the user.

FIG. 14 details a preferred process of updating the page compositing stacks to reflect the change specified by the user, as performed in step 1009.

The processing of step 1009 starts at step 1401. In this step, the FCS/Pixel-Run/Tile list created in step 1104, that is associated with the object the user changed, is obtained.

In the next step 1402, the FCS/Pixel-Run/Tile list obtained in step 1401 is culled to remove FCSs that only contribute other objects that were distinguished in step 1108. To do this, for each FCS in the FCS/Pixel-Run/Tile list, the pixel runs of the FCS are examined to see if they contribute to the object changed by the user. One method of determining if a pixel run contributes to the object in question, is to compute the x and y coordinates of the start of the pixel run, and examine the colour value of that pixel location in the object image constructed in step 1108. If the colour value is the background colour, then the pixel run does not contribute to the object. If no pixel-runs of the FCS contribute to the object, then the FCS is removed from the FCS/Pixel-Run/Tile list. Once the culling process is complete, then the first element of the FCS/Pixel-Run/Tile list is specified as the "current element".

The processing then moves to step 1403, where the FCS is obtained from the current element in the FCS/Pixel-Run/Tile list. By following this process, tiles associated with the object changed by the user can be identified.

The process of step 1009 then moves to decision point 1404. In decision point 1404, if the user has not elected to change the colour of the fill, then the processing moves to decision point 1405. If the user has elected to change the colour of the fill, then the processing moves to step 1406. In this first example implementation, the user is deemed to have chosen to change the colour of the fill, so the processing moves to step 1406.

In step 1406, the FCS is updated to reflect the colour change specified by the user. There are a number of ways this can be done. For example, a new fill structure may be created for the new colour, and the FCS updated to refer to the new fill instead of the old fill. Alternatively, the data in the original fill structure can be modified to reflect the colour change. Note that if this is done, then the colour of every object on the page which uses the original fill will be changed. This may, or may not, be what the user expects. In another alternative, a new fill structure may be created, and a new level added to the FCS using a suitable blend operator so that the blend of the original fill with the new fill creates the desired colour. The selection of which of these alternatives is used can depend on the page contents. If the original fill is not used in any other FCSs, then it would be most efficient to update the original fill.

After step 1406 is complete, the processing moves to step 1409. In step 1409, all tiles that include pixel runs that refer to the FCS are marked as out-of-date. This is done by iterating through the list of pixel-runs and associated tiles attached to the current element in the FCS/Pixel-Run/Tile list. The processing then moves to decision point 1410.

In the decision point 1410, if the just processed FCS was the last element in the FCS/Pixel-Run/Tile list, then the processing of step 1009 stops. Otherwise, if there are remaining FCSs in the FCS/Pixel-Run/Tile list, the next element in this list is made the current element, and the processing then loops back to step 1403.

Figure 8A:
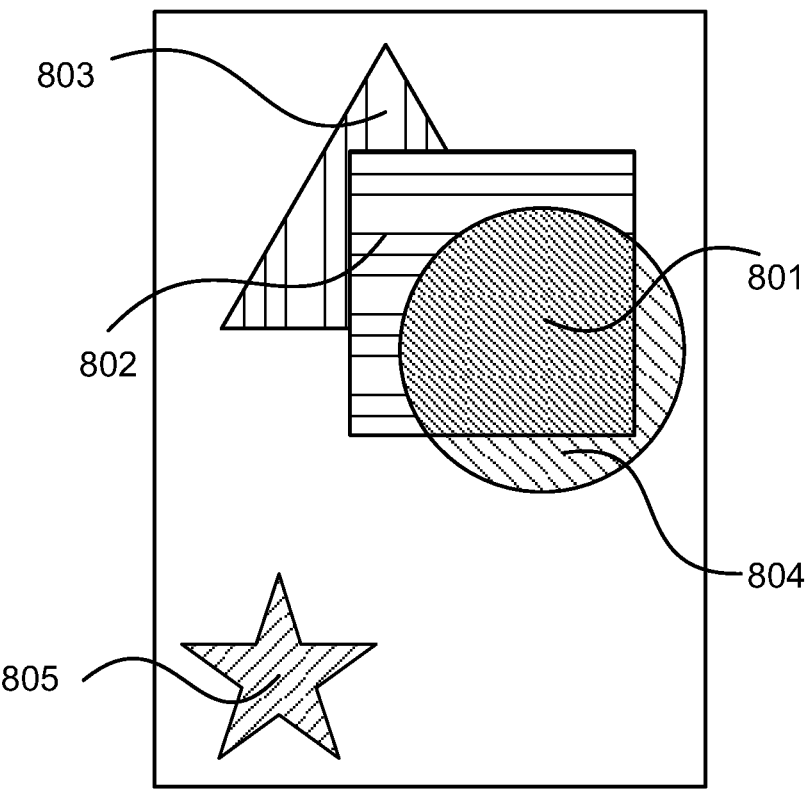
FIG. 8A is diagram showing the resulting output bitmap for a first example implementation.

FIG. 8A shows an example of the results of processing the page in FIG. 5 with the first example implementation. The region marked 801 has the colour wanted by the user, and the colour of region marked 802 has changed as well. This is because the whole of the square object (item 503 on FIG. 5) has changed colour.

The colours of all other regions of the page have remained the same. These regions are the section of the triangle marked 803, the section of the circle marked 804, and the star marked 805.

Second Example Implementation

The second example implementation of the process which enables the preview system interface loop is now described. In this implementation, the user has chosen to modify the colour of the region formed by the intersection of all of the objects which contribute to the selected pixel.

As for the first implementation, the example input page given in FIG. 5 will be used to illustrate the functioning of the second implementation.

The processing of the second implementation is similar to that of the first implementation except that a different path is taken at decision point 1105 of FIG. 11. In the second implementation, the user has chosen to modify the intersection of objects, so the processing moves to step 1107. In step 1107, an image is generated of the contribution of the currently selected fill to the area of the page bounded by the intersection of objects contributing to the selected pixel. A preferred approach for performing this step is further explained with reference to FIG. 13. Once step 1107 is complete, the processing moves to step 1108, and the processing continues as for the first example implementation.

Figure 6B:
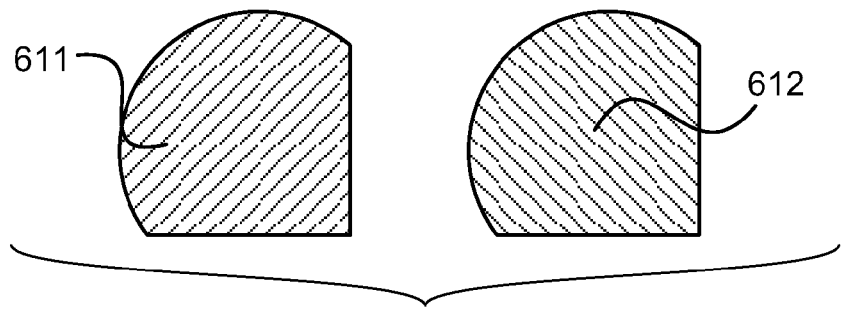
FIG. 6B is a diagram showing the objects displayed to the user when in intersection objects mode.
Figure 6C:
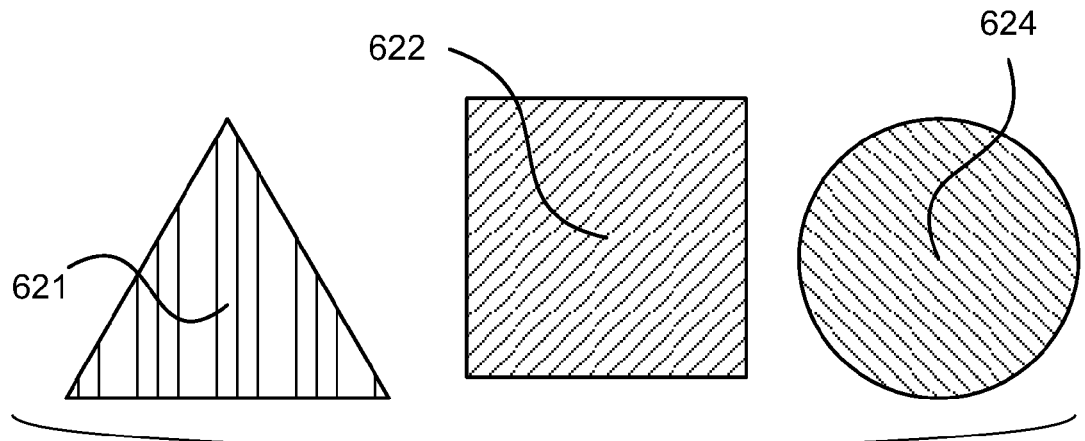
FIG. 6C is a diagram showing the objects displayed to the user when in flexible fillmap format mode.
Figure 7A:
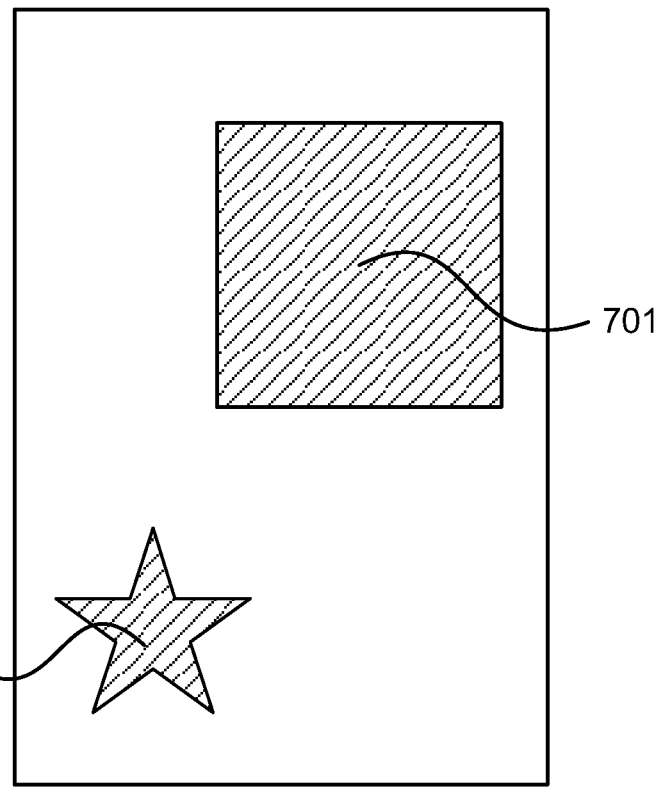
FIG. 7A is a diagram showing the results of executing step 1106 for the first iteration through the loop.
Figure 7B:
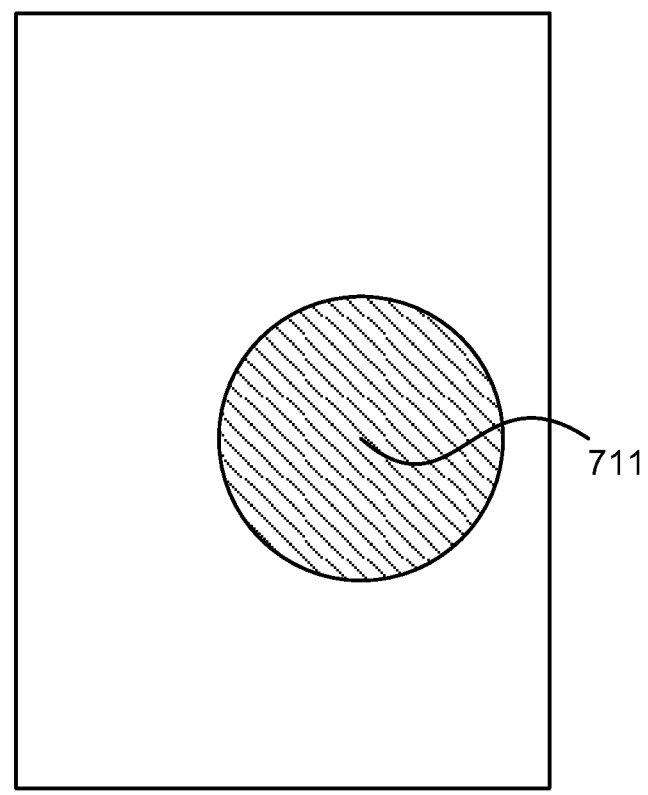
FIG. 7B is a diagram showing the results of executing step 1106 for the second iteration through the loop.

An example of the result of the processing described in FIG. 11 for the second example implementation is shown in FIG. 6B. After completing the steps described with reference to FIG. 11, the result is formed by images of two objects shown in FIG. 6B. Both objects have the shape defined by the intersection of the square (item 503) and the circle (item 504) given in FIG. 5. The first object (item 611 in FIG. 6B) has the colour of the square, and the second object (item 6112 in FIG. 6B) has the colour of the circle.

Figure 13:
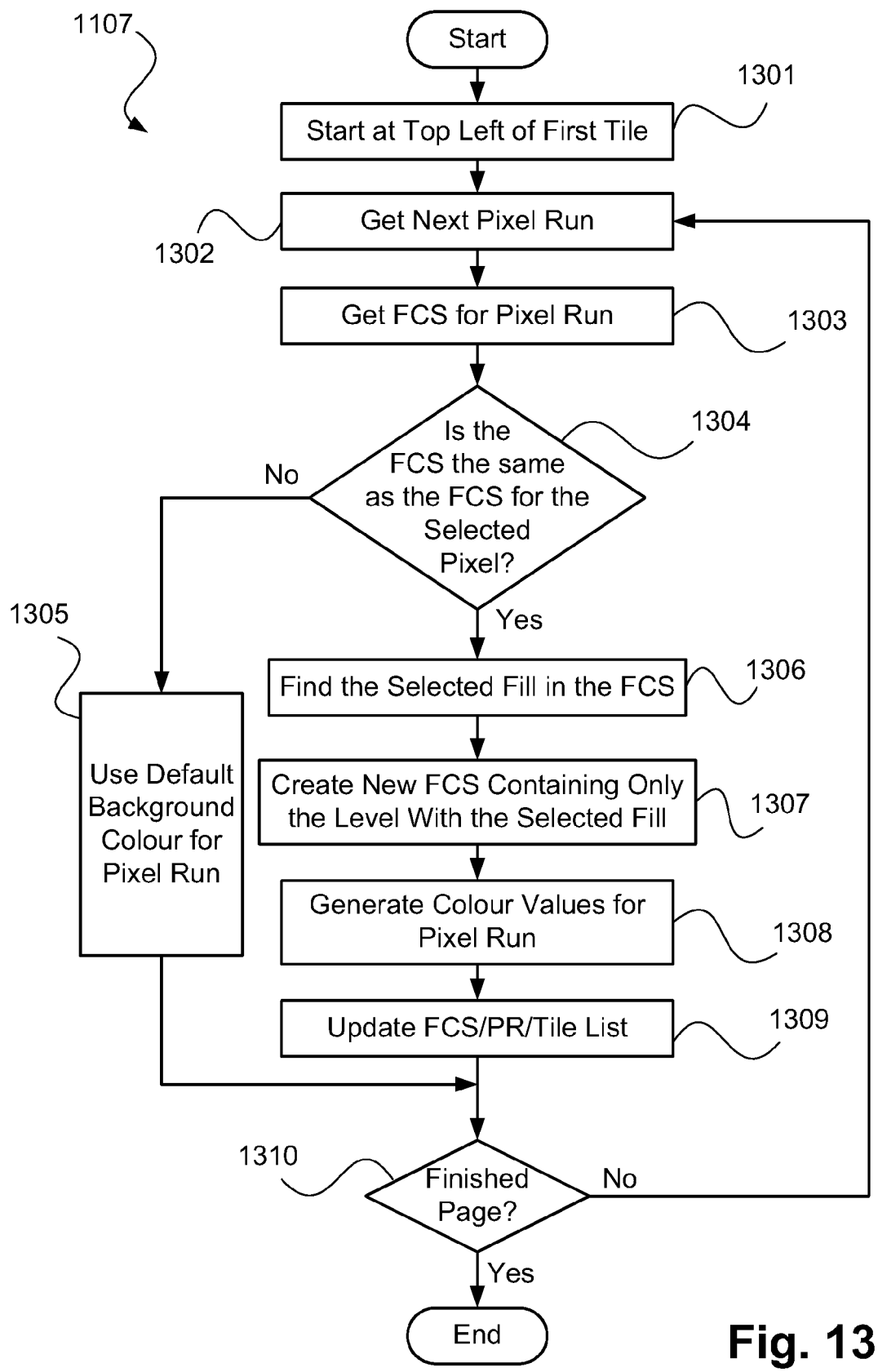
FIG. 13 is a schematic flow diagram illustrating a method of generating an image of the contributions of a selected fill to the area of the page bounded by the intersection of all objects contributing to the output of a point on the page.

FIG. 13 details a preferred process 1107 of generating an image of the contribution of a selected fill to the region on the page defined by the intersection of all objects which contribute the output of the selected pixel. Generally, the process 1107 operates to determine the required compositing sequence by identifying a corresponding edge in the graphical representation using a position of the region of interest, and determining a compositing sequence associated with the identified edge.

The process 1107 starts at step 1301. In step 1301, the current location is set at the top left of the first fillmap tile in the page. The processing then moves to step 1302, where the pixel run starting at the current location is selected. At step 1303, the fillmap tile which contains the obtained pixel run is located and the FCS for the obtained pixel run is also obtained.

The processing them moves to decision point 1304. In this decision point, a different path is taken if the obtained FCS is the same as the FCS for the selected pixel 507. In this second example implementation, the processing method is seeking only those areas of the page which have the same combination of fills and compositing operations as the pixel selected by the user.

If the obtained FCS is not the same as the FCS for the selected pixel 507, then the processing moves to step 1305. In step 1305, a default background colour is generated for the pixel run. The processing then moves to the decision point 1310.

If, on the other hand, the obtained FCS is the same as the FCS for the selected pixel 507, then the processing moves to step 1306. In step 1306, the level in the obtained FCS containing the current fill is found. The processing then moves to step 1307 where a new FCS is constructed for the pixel run. This new FCS contains only a single level containing the selected fill. The processing of step 1107 then moves to step 1308 where the newly constructed FCS is used to generate colour values for the current pixel run.

In step 1309 which follows, the FCS obtained in step 1303 is added to the FCS/Pixel-Run/Tile list created in step 1104 if the FCS does not already exist in this list. The pixel run and it's associated tile are further added to the pixel-run list attached to this FCS in the FCS/Pixel-Run/Tile list. The processing then moves to the decision point 1310.

In the decision point 1310, if the just processed pixel run was the last pixel run in the last tile of the page, then the processing of step 1107 stops. Otherwise, if there are remaining pixel runs in the current tile, then the current location is set to the pixel following the current pixel run. If there are no remaining pixel runs in the current tile, then the current location is set to the top left of the next tile. The processing of step 1107 then loops back to step 1302.

Note that an alternative approach to traversing the page would be to start from the tile containing the selected pixel and progress up and down the page from that tile. This has the effect of searching for pixel runs in the vicinity of the region of interest, and particularly for extending the searching for pixel runs out of and about the region of interest, and stopping once no compositing sequence comprising the representative colour element is found on a scan line in the vicinity of the region of interest.

Figure 8B:
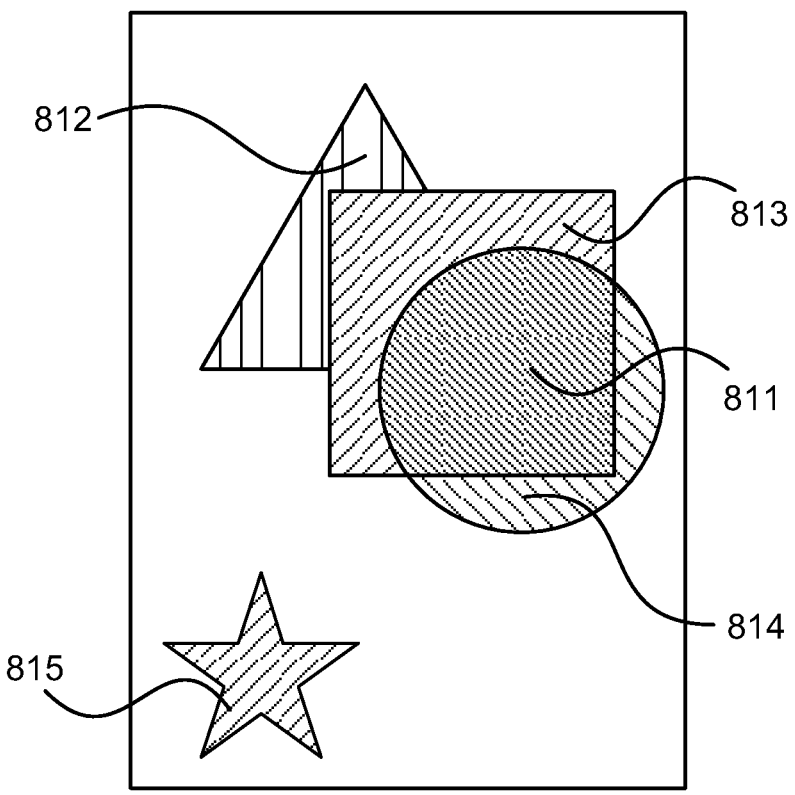
FIG. 8B is diagram showing the resulting output bitmap for a second example implementation.

FIG. 8B shows an example of the results of processing the page in FIG. 5 with the second example implementation. The region marked 811 has the colour desired by the user.

The colours of all other regions of the page have remained the same. These regions are the section of the triangle marked 812, the section of the square marked 813, the section of the circle marked 814, and the star marked 815.

Third Example Implementation

A third example implementation of the process which enables the preview system interface loop is now described. In this third implementation, the user has chosen to modify the transparency of one of the objects which contribute to the selected pixel 507.

This third example implementation introduces the concept a High-Flexibility Fillmap. In a normal fillmap (as described in the Context section above), if at some point on the page, an object is fully obscured by an opaque object above it in z-order, then the fully obscured object(s) will be omitted from the Fillmap Compositing Stack that corresponds to that point on the page. The FCS is built up as objects are added in z-order, and when a fully opaque object is encountered, then all levels for objects below the opaque object in the FCS are discarded. This is typically done to reduce memory consumption such that fillmap rendering can be efficiently performed on a device with reduced memory capacity, such as portable devices. Therefore, information about the fully obscured object has been lost for this pixel location on the page. In a High-Flexibility Fillmap, objects below a fully opaque object are not discarded in this way, and thus the FCS retains information about all objects that were placed at that point on the page. Thus information about fully obscured objects is retained in the FCSs. This has the advantage that a greater range of editing changes may be made to the fillmap, albeit at increased memory consumption.

As for the first example implementation, the example input page given in FIG. 5 will be used to illustrate the functioning of this implementation.

Figure 15A:
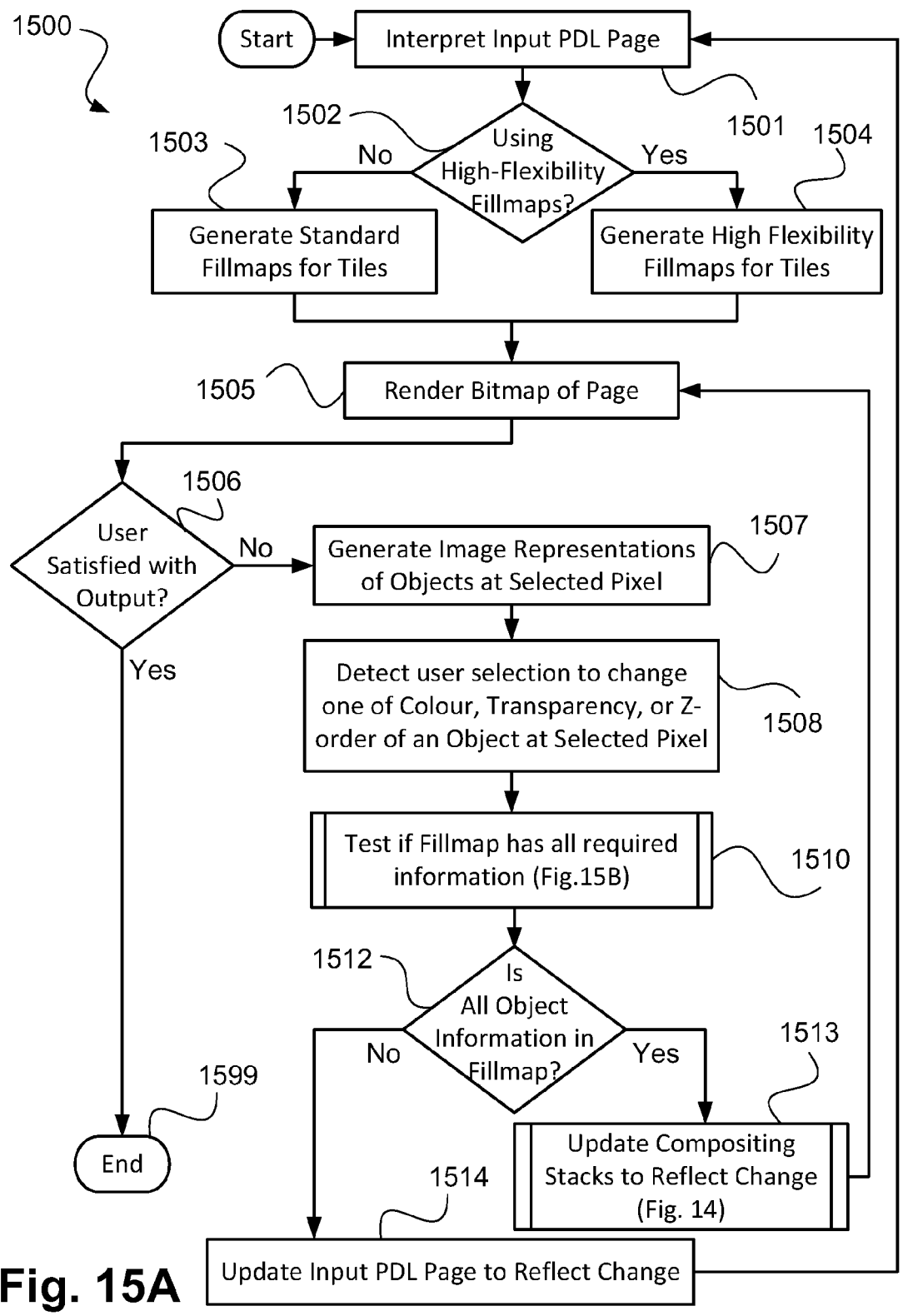
FIGS. 15A and 15B form a schematic flow diagram illustrating the processing steps of the third and fourth example implementations.
Figure 15B:
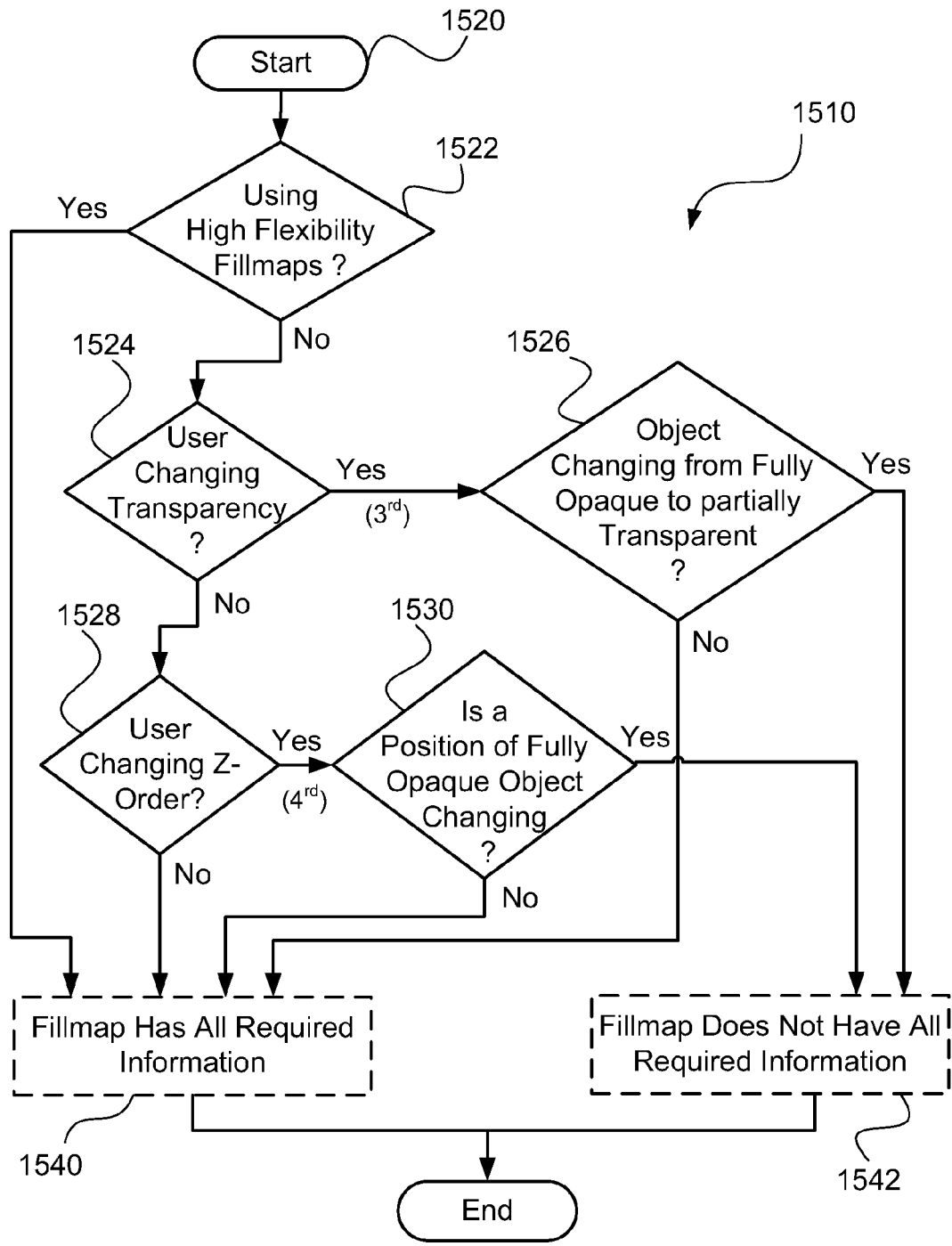

FIGS. 15A and 15B collectively show a process 1500 of how the third example implementation functions. As with the first example implementation, in a first step 1501 seen in FIG. 15A, the printable document 103 is read from the PDL store 102 and one of the document pages is interpreted into graphical objects 121 by the PDL interpreter module 120. The processing then moves to decision step 1502 where different paths are followed depending on whether a particular optimization mode has been selected by the user, to use either high-flexibility fillmaps, or normal fillmaps. Note that the user could implicitly make this optimization mode decision by indicating before the fillmap is created what sort of change will likely be made. For example, if there is a chance that a transparency change can happen, particularly a change of an object from opaque to at least partly transparent, or that z-ordering can be changed, a high-flexibility fillmap can be generated. Moreover, the high-flexibility fillmap can be generated based on the source of the input PDF document 103. For example, if the input document was generated using design software, more sophisticated changes are more likely to happen (such as changing transparency and z-ordering). Therefore, for such cases high-flexibility fillmap could be automatically generated. If the user has chosen to use high-flexibility fillmaps, then the processing moves to step 1504. In step 1504, high-flexibility fillmaps are generated for all tiles in the page by the fillmap builder 201. The high-flexibility fillmaps are stored in the memory 1606 to provide for a further print preview representation by the preview and editor module 126 for reproduction on the display 104. If, on the other hand, the user has chosen to use standard fillmaps, then the processing moves to step 1503, where standard fillmaps are generated for all tiles on the page by the fillmap builder 201. Notwithstanding the selection determination of the optimization mode at step 1502, where standard fillmaps are selected, the ultimate modifying operation actually performed may nevertheless need high-flexibility fillmaps to be selected on a subsequent iteration of the process 1500, as will be apparent from below.

In both cases, after generating the fillmaps, the tile fillmaps are cached and marked as out of date in a similar way to the first example implementation. The processing then moves to step 1505 where the page bitmap is generated by the fillmap renderer 203, and the bitmap is presented to the user by the preview and editor module 126 on the display 1614. This is done in a similar way to the first example implementation, and need not be detailed here. The processing then moves to decision point 1506. If the user is satisfied with the page bitmap (Yes), then the process 1500 concludes at step 1599. If the user is not satisfied with the page bitmap, then the processing moves to step 1507. In step 1507, the user indicates a pixel on the page (e.g. pixel 507) where he/she is not satisfied with the colour and/or transparency mode, and then image representations of all page objects associated with the FCS corresponding to the pixel selected by the user are generated by the fillmap render module 203. This process is identical to that of the first and second example implementations, and again need not be detailed here.

The processing then moves to a selection step 1508 where the process 1500 detects if the user selects to changes one of colour, transparency, or Z-order (these being the different classes of modifying operations) of an object at the selected pixel. After step 1508, the processing of the method 1500 then moves to step 1510 which tests if the fillmap has all of the required information to make the change selected by the user.

Step 1510 is detailed in FIG. 15B. An entry point 1520 follows step 1508 and step 1522 then checks if high-flexibility fillmaps are being used, as established at step 1504, again representing the determined optimization mode. If so (Yes), step 1510 proceeds to set a state 1540 that the fillmap has all the required information to make the selected change.

Where step 1522 determines No, that only standard fillmaps are being used, step 1524 follows to ascertain whether the user has selected to change transparency of the object. Where the test of step 1524 is Yes, this represents the third example implementation and process continues to step 1526. In step 1526 a test is performed to determine if the object, intended to have its transparency changed by the user, is a fully opaque object. Where the object is not fully opaque (i.e. already at least partly transparent), the state 1540 is asserted. However, where the object is fully opaque, because high-flexibility fillmaps are not being used, then a state 1542 is set, that the fillmap does not have all the required information.

Where step 1524 determines that transparency is not being changed, step 1528 follows to determine if the user intends to change the Z-order of the selected object. If the determination is No, for example indicative of a simple colour change (like step 1008), then the state 1540 is asserted. Where step 1524 determines that Z-order is to be changed, this relates to a fourth example implementation, where processing continues to step 1530. In step 1530, a test is performed to determine if the user is selecting to change the Z-order of a fully opaque object. Where this is the case (Yes), the state 1542 is asserted that the fillmap doesn't have all the required information. This is because the change may activate an otherwise previously obscured transparent object. Where the test of step 1530 ascertains a change to an at least partly transparent object, that object will already be present in the FCS for the pixel location and the state 1540 will be set.

The object images generated in step 1507 in accordance with the selected optimization mode (1503 or 1504) are presented to the user by the preview and editor module 126, and to permit the user selection in step 1508. The user can then specify the change to the selected object. The specification of a transparency change could be done in several ways, for example, by using a slider control. Completion of the step 1510 of FIG. 15B results in one of the states 1540 or 1542 being set.

The processing of the method 1500 (FIG. 15A) then moves to a decision step 1512 which invokes a branch based on which of the states 1540 or 1542 has been set.

If all required object information is in the fillmap, and the required object originally was partially transparent, then the processing moves to step 1513, which is discussed below.

If all required object information is not in the fillmap, and thus the desired modifying operation is not supported by the fillmap intermediate representation (step 1512, No), then the processing moves to step 1514. In step 1514, the input printable document 103 is updated to reflect the user's requested change. In the case of a PDF document, this would be done by modifying the transparency of the object in the input PDF document that corresponds to the object modified by the user, and then creating a new version of the input PDF document. The process 1500 then loops back to step 1501.

In a further alternative, step 1514 may return to step 1501 to instigate an interpretation in step 1501 that results in the generation of a high-flexibility fillmap at step 1504. This then would ultimately invoke step 1513. This has the effect of the utilising of the graphics data written in the page description language to generate a further print preview representation stored in the alternative high-flexibility intermediate graphics format containing the required information to perform the desired modifying operation.

Alternatively, where all the required object information is in the fillmap (step 1512, Yes), be it a standard fillmap or a high-flexibility fillmap, step 1513 follows such that all compositing stacks for pixel runs covered by the changed object are updated by the renderer module 122 to reflect the change specified by the user. When the compositing stacks have been updated in step 1513, the method 1500 returns to step 1505 to render a bitmap of the updated page to the display 1614.

A preferred approach for step 1513 is generally found in FIG. 14. Most of the processing steps for FIG. 14 are unchanged from the first example implementation, and need not be repeated. In the third example implementation however, the user is deemed to have chosen to modify the transparency of the fill, so in step 1404, the processing moves to the decision point 1405.

In the decision point 1405, if the user has not elected to change the transparency of the fill, then the processing moves to step 1408. Otherwise, if the user has elected to change the transparency of the fill the processing moves to step 1407. As stated above, in the third example implementation, the user is deemed to have elected to change the transparency of the fill, so the processing moves to step 1407.

In step 1407, the FCS is updated by the renderer module 122 to reflect the transparency change specified by the user. There are a number of possible ways this can be done. For example, a new fill structure may be created with the original fill colour and the new alpha value, and the FCS updated to refer to the new fill instead of the old fill. Alternatively, the data in the original fill structure can be modified to reflect the alpha change. Which method is selected can depend on the contents of the document. If only a single FCS refers to the fill, then it is most efficient to update the original fill. If, on the other hand, multiple FCSs refer to the fill, then it may be best to create a new fill. When step 1407 is concluded, steps 1409 and 1410 follow as described above, thus completing implementation of step 1513.

Figure 9A:
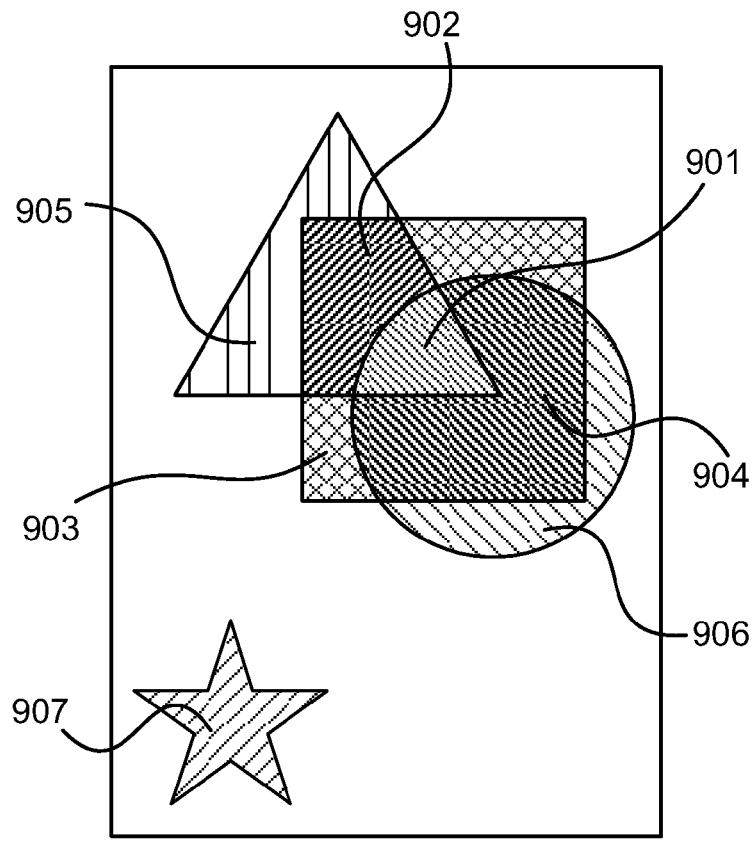
FIG. 9A is diagram showing the resulting output bitmap for a third example implementation.

FIG. 9A shows an example of the results of processing the page in FIG. 5 with the third example implementation. In this example, the user has changed the square from fully opaque to partially transparent. The region marked 901 has the colour required by the user. Since the square is no-longer opaque, region 902 has been formed where the triangle shows through the square. In region 903, the page background is contributing to the colour of this region, and finally in region 904, the page background, the square and the circle are all contributing to the colour of this region.

The colours of all other regions of the page have remained the same. These are the section of the triangle marked 905, the section of the circle marked 906 and the star marked 907.

Fourth Example Implementation

The fourth example implementation of the process which enables the preview system interface loop is now described. In this example implementation, the user has chosen to modify the z-order of one of objects which contribute to the selected pixel.

As for previous implementations, the example input page given in FIG. 5 will be used to illustrate the functioning of this implementation.

The fourth implementation is very similar to the third implementation, and only the points of difference will be noted here.

In the selection step 1508, in the fourth implementation, the user is deemed to have chosen to modify the z-order of the selected fill, and so the user via the GUI has selected one of the objects and changed the z-order of that object, for example by bringing the selected object in-front of one or more of the objects it lies behind, or moving the selected object behind one or more of the other objects it lies in front of. The processing of steps 1528 and 1530 are effective when all object information is not in the fillmap only if the object, that has been moved in z-order, is fully opaque, and the object has been moved behind other objects, or if the object was previously obscured by another fully opaque object and has now been moved in-front of that fully opaque object.

Step 1513 is detailed within FIG. 14. Most of the processing steps for FIG. 14 are unchanged from the first example implementation, so need not be described now. In the fourth example implementation, the user is deemed to have chosen to modify the z-order of the fill, so in step 1404, the processing always moves to the decision point 1405, also consistent with the third example implementation. Again, since the user is deemed to have chosen to change the z-order of the fill, rather than an alpha or transparency value, at the decision point 1405, the processing moves to step 1408.

In step 1408, the FCS is updated to reflect the z-order change specified by the user. The order of fills in the FCS is the same as the order on the page of the objects with which these fills are associated, so if the user has specified that one object be moved in front of another object, then the fill associated with the first object should be moved ahead of the fill associated with the second object in the FCS.

All other steps of the fourth implementation operate identically to the third implementation.

Note that, subject to the relationship of objects and/or the selection of high-flexibility fillmaps, it is possible for the user can change colour, alpha and z-order all in the same operation, appreciating that FIG. 15B illustrates a logical deconstruction of steps that may be performed simply upon the user selection of step 1508.

Figure 9B:
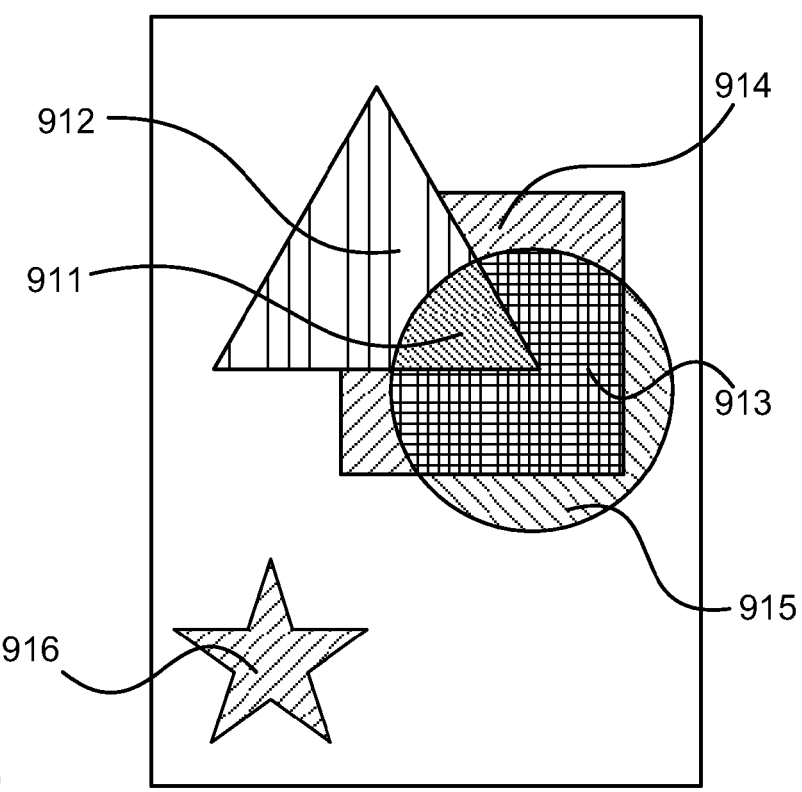
FIG. 9B is diagram showing the resulting output bitmap for a fourth example implementation.

FIG. 9B shows an example of the results of processing the page in FIG. 5 with the fourth example implementation. In this example, the user has moved the square behind the triangle. The region marked 911 has the colour required by the user (because the objects contributing to this region are now different—the partially transparent circle overlying the triangle). Since the triangle is no longer obscured, region 912 has changed shape. Finally region 913 is smaller than the corresponding original source region 505, as the triangle has cut out a section from it, being that originally defined by the intersection of the circle and the square. Further note that the region 913 is the same colour is it was on the input page, i.e. the colour of region 505. From a comparison of FIG. 9B with FIG. 5, it will be appreciated that the colours of all other regions of the page have remained the same. These are the section of the square marked 914, the section of the circle marked 915 and the star marked 916.

The arrangements described above provide for a user of the DFE 101 to provide for editing or adjustment of a document 103 intended for printing, during the actual printing process. The intermediate representation of the print job, for example using a fillmap representation, provides a basis by which the user can iteratively preview and edit the objects of the print job, via a pixel bitmap representation. When satisfied with the job, the changes, that are made locally within the DFE 101, can be printed without a need to alter the source document, which may have been created according to any one of a wide range of drawing/publishing applications. The ability of the described DFE 101 to manipulate a document in a generic printable form affords substantial utility in those cases where final or minor adjust of the document is required at the time of printing.

INDUSTRIAL APPLICABILITY

The arrangements described are applicable to the computer and data processing industries, and particularly for the editing or modification of graphical representations expressed in an intermediate form often associated with printing, such as a fillmap representation.

The foregoing describes only some embodiments of the present inventions, and modifications and/or changes can be made thereto without departing from the scope and spirit of the inventions, the embodiments being illustrative and not restrictive.

The invention claimed is:

1. A method for modifying an intermediate representation of a document written in a page description language, the method comprising:

rendering the document to produce the intermediate representation, the intermediate representation being a print preview representation stored as intermediate graphics data in an intermediate graphics format;

detecting a modifying operation for modifying a graphics content of the print preview representation;

determining whether the print preview representation contains intermediate graphics data required to perform the modifying operation based on a class of the modifying operation and a content of the print preview representation affected by the detected modifying operation; and where the print preview representation contains the intermediate graphics data required to perform the modifying operation, modifying the print preview representation, and otherwise utilising the document written in the page description language to perform the modifying operation to generate a modified print preview representation.

2. The method according to claim 1, wherein the modifying of the print preview representation comprises:

selecting a region of interest to be modified;

determining a compositing sequence associated with the region of interest using data from the intermediate graphical representation, the compositing sequence comprising at least one representative colour element;

identifying portions in the intermediate graphics data affected by the representative colour element by analysing compositing sequences associated with the portions in the intermediate graphical representation using the representative colour element, the identified portions forming an object contributing to the region of interest having a representative colour defined by the representative colour element; and rendering the identified portions using the representative colour element to form the contributing object having the representative colour.

3. The method according to claim 2, further comprising displaying, independently from the print preview representation of the document, the contributing object having the representative colour to modify the print preview representation.

4. The method according to claim 1, wherein the modifying comprises:

selecting a region of interest to be modified;

determining a compositing sequence associated with the region of interest using the intermediate graphics data, the compositing sequence comprising at least one representative colour element;

selecting at least one representative compositing sequence using the representative colour element, the selected representative sequence comprising the representative colour element;

identifying portions in the intermediate graphics data associated with the selected representative compositing sequence, the identified portions forming an object contributing to the region of interest having a representative colour defined by the representative colour element;

rendering the identified portions using the representative colour element to form the contributing object having the representative colour; and displaying, independently from the displayed print preview representation, the contributing object having the representative colour to adjust the print preview representation.

5. The method according to claim 1, wherein the modifying operation is at least one of changing colour, changing transparency, and changing z-order.

6. The method according to claim 1, wherein the determining of whether the print preview representation contains intermediate graphics data required to perform the modifying operation is further based on the intermediate graphics format.

7. The method according to claim 1, wherein the utilising the document written in the page description language to generate a modified print preview representation comprises generating a further print preview representation stored in a further intermediate graphics format containing the required intermediate graphics data to perform the modifying operation.

8. The method according to claim 7, wherein the generating the further print preview representation comprises preserving obscured objects in the intermediate graphical representation, where the modifying operation is at least one of changing transparency and changing z-order.

9. The method according to claim 1, further comprising, where the print preview representation does not contain intermediate graphics data required to perform the modifying operation, modifying the document written in the page description language.

10. The method according to claim 1 wherein the document written in the page description language is a PDL representation of the document.

11. The method according to claim 7, wherein the intermediate graphics format data is a fillmap representation and the further intermediate graphics format is a high-flexibility fillmap representation.

12. The method according to claim 2, wherein portions affected by the representative colour element are identified by selecting, from a plurality of pixel runs in the intermediate graphics format, pixel runs associated with a compositing sequence comprising the representative colour element.

13. The method according to claim 12, further comprising identifying pixel runs in a vicinity of the region of interest by extending searching for pixel runs about the region of interest, and stopping once no compositing sequence comprising the representative colour element is found.

14. The method according to claim 2, further comprising updating a compositing sequence of at least one pixel run affected by the representative colour element using an adjusted colour of the contributing object.

15. The method according to claim 14, further comprising determining a plurality of tiles affected by the updating in the compositing sequences and rendering the tiles to adjust the graphical representation.

16. The method according to claim 2, wherein the contributing object has a shape identified by the intermediate graphical representation.

17. The method according to claim 2, wherein the determining the compositing sequence step comprises:

identifying a corresponding edge in the graphical representation using a position of the region of interest; and
determining a compositing sequence associated with the identified edge.

18. A non-transitory computer readable storage medium having a program recorded thereon for causing a processor to execute a method to modify an intermediate representation of a document written in a page description language, the method comprising:
rendering the document to produce the intermediate representation, the intermediate representation being a print preview representation stored as intermediate graphics data in an intermediate graphics format;
detecting a modifying operation for modifying a graphics content of the print preview representation;
determining whether the print preview representation contains intermediate graphics data required to perform the modifying operation based on a class of the modifying operation and a content of the print preview representation affected by the detected modifying operation; and
where the print preview representation contains intermediate graphics data required to perform the modifying operation, modifying the print preview representation, and otherwise utilising the document written in the page description language to perform the modifying operation to generate a modified print preview representation.

19. A computer apparatus comprising at least one processor and a memory storing a program for causing the at least one processor to execute a method to modify an intermediate representation of a document written in a page description language, the method comprising:
rendering the document to produce the intermediate representation, the intermediate representation being a print preview representation stored as intermediate graphics data in an intermediate graphics format;
detecting a modifying operation for modifying a graphics content of the print preview representation;
determining whether the print preview representation contains intermediate graphics data required to perform the modifying operation based on a class of the modifying operation and a content of the print preview representation affected by the detected modifying operation; and
where the print preview representation contains intermediate graphics data required to perform the modifying operation, modifying the print preview representation, and otherwise utilising the document written in the page description language to perform the modifying operation to generate a modified print preview representation.

20. A printer having a Digital Front End comprising the computer apparatus according to claim 19.

* * * * *